(12) United States Patent
Arita et al.

(10) Patent No.: US 6,730,149 B2
(45) Date of Patent: May 4, 2004

(54) INK COMPOSITION AND INKJET RECORDING METHOD AND APPARATUS USING THE INK COMPOSITION

(75) Inventors: Hitoshi Arita, Yokohama (JP); Nobutaka Osada, Mishima (JP); Kiyofumi Nagai, Machida (JP); Kakuji Murakami, Atsugi (JP); Tomoko Maeda, Saitama (JP); Akihiko Gotoh, Atsugi (JP)

(73) Assignee: Ricoh Company Limited, Tokyo (JP)

( * ) Notice: Subject to any disclaimer, the term of this patent is extended or adjusted under 35 U.S.C. 154(b) by 101 days.

(21) Appl. No.: 10/050,942

(22) Filed: Jan. 22, 2002

(65) Prior Publication Data
US 2003/0010252 A1 Jan. 16, 2003

(30) Foreign Application Priority Data
Jan. 22, 2001 (JP) ........................ 2001-013597
Mar. 22, 2001 (JP) ........................ 2001-083770
Sep. 21, 2001 (JP) ........................ 2001-289930

(51) Int. Cl.$^7$ .............................................. C09D 11/00
(52) U.S. Cl. ................ 106/31.27; 106/31.6; 106/31.33; 106/31.65; 106/31.58; 106/31.86
(58) Field of Search .................... 106/31.27, 31.6, 106/31.33, 31.65, 31.58, 31.86; 347/100

(56) References Cited

U.S. PATENT DOCUMENTS

| | | | |
|---|---|---|---|
| 3,962,389 A | * | 6/1976 | Takase et al. ............. 156/89.28 |
| 4,554,555 A | | 11/1985 | Aruga et al. |
| 4,581,071 A | | 4/1986 | Akutsu et al. |
| 4,620,876 A | | 11/1986 | Fujii et al. |
| 4,631,085 A | | 12/1986 | Kawanishi et al. |
| 4,647,310 A | | 3/1987 | Shimada et al. |
| 4,711,668 A | | 12/1987 | Shimada et al. |
| 4,713,113 A | | 12/1987 | Shimada et al. |
| 4,737,190 A | | 4/1988 | Shimada et al. |
| 4,793,860 A | | 12/1988 | Murakami et al. |
| 5,431,720 A | | 7/1995 | Nagai et al. |

(List continued on next page.)

FOREIGN PATENT DOCUMENTS

| | | |
|---|---|---|
| JP | 62-149770 | 7/1987 |
| JP | 63-048374 | 3/1988 |
| JP | 63-066268 | 3/1988 |
| JP | 05-155023 | 6/1993 |
| JP | 05-331391 | 12/1993 |
| JP | 08-333542 | 12/1996 |
| JP | 09-085949 | 3/1997 |
| JP | 09-123437 | 5/1997 |
| JP | 10-183003 | 7/1998 |
| JP | 11-34339 | 12/1999 |
| JP | 11-349870 | 12/1999 |
| JP | 2000-007961 | 1/2000 |
| WO | WO98/42513 | 1/1998 |

*Primary Examiner*—Helene Klemanski
*Assistant Examiner*—Veronica F. Faison
(74) *Attorney, Agent, or Firm*—Oblon, Spivak, McClelland, Maier & Neustadt, P.C.

(57) ABSTRACT

An ink composition including a colorant; and a solvent, wherein a zeta potential 2 between the colorant and a material selected from the group consisting of silicon, glass, silicon oxide, titanium oxide, chromium oxide, titanium nitride, silicon nitride, zirconium and polyimide is from 0 to −50 mV at a pH of from 6.5 to 11.5. A corrosion inhibitor is preferably added to the ink composition to adjust the zeta potential 2. An ink cartridge containing the ink which optionally includes a recording head discharging the ink to form an image on a recording material, wherein the zeta potential 2 between the colorant in the ink and a material of the recording head contacting the ink is from 0 to −50 mV at a pH of from 6.5 to 11.5. An inkjet recording apparatus including the ink cartridge and a carriage carrying the ink cartridge.

20 Claims, 4 Drawing Sheets

U.S. PATENT DOCUMENTS

| | | | |
|---|---|---|---|
| 5,514,208 A | 5/1996 | Nagai et al. | |
| 5,619,765 A | 4/1997 | Tokita et al. | |
| 5,622,550 A | 4/1997 | Konishi et al. | |
| 5,782,254 A | 7/1998 | Tanikawa et al. | |
| 5,810,915 A | 9/1998 | Nagai et al. | |
| 5,851,717 A | 12/1998 | Tsubuko et al. | |
| 5,879,439 A | 3/1999 | Nagai et al. | |
| 5,879,512 A * | 3/1999 | McGenity et al. | 162/135 |
| 5,882,390 A | 3/1999 | Nagai et al. | |
| 5,968,301 A | 10/1999 | Murakami et al. | |
| 5,972,082 A | 10/1999 | Koyano et al. | |
| 5,993,524 A | 11/1999 | Nagai et al. | |
| 6,020,103 A | 2/2000 | Tsubuko et al. | |
| 6,120,589 A | 9/2000 | Bannai et al. | |
| 6,231,652 B1 | 5/2001 | Koyano et al. | |
| 6,261,349 B1 | 7/2001 | Nagai et al. | |
| 6,378,999 B1 * | 4/2002 | Doi et al. | 347/100 |
| 6,439,713 B1 | 8/2002 | Noguchi et al. | |
| 6,460,989 B1 * | 10/2002 | Yano et al. | 347/101 |
| 6,578,958 B2 * | 6/2003 | Gotoh et al. | 347/100 |
| 2002/0083866 A1 * | 7/2002 | Arita et al. | 106/31.27 |
| 2003/0097958 A1 * | 5/2003 | Yu et al. | 106/31.6 |

\* cited by examiner

INK COMPOSITION AND INKJET RECORDING METHOD AND APPARATUS USING THE INK COMPOSITION

BACKGROUND OF THE INVENTION

1. Field of the Invention

The present invention relates to an ink composition for inkjet recording and to an inkjet recording method and apparatus using the ink composition.

2. Discussion of the Background

Recently, inkjet recording methods have rapidly been in widespread use because of having the following advantages:

(1) printers used therefor are small in size and low-cost;
(2) running cost is relatively low; and
(3) printers can produce images at low noise.

Inkjet printers which can record images on a plain paper such as transfer papers for electrophotography; printing papers; recording papers for typewriter, wire-dot printers and word processors; letter papers; report papers; etc., are marketed. There are inkjet printers having a recording head having a member which contacts an ink and which is made of glass, silicone or silicone oxide because these materials can be finely processed with a high-degree of accuracy by a simple method.

As the ink for use in such inkjet printers, inks which include a solvent, and a colorant and a wetting agent (e.g., polyhydric alcohols and their ethers), which are dispersed or dissolved in the solvent are typically used. The inks optionally include a penetrant, an antimildew agent, an antiseptic agent, and a dispersant, if desired. When such inks are allowed to settle for a long period of time while set in an inkjet printer which has a recording head including members which contact the ink and which is made of glass, silicon or silicon oxide, the glass, silicon or silicon oxide is dissolved in the inks. Thereby the accuracy of dimension of the members deteriorates, resulting in changes of the size and/or discharging speed of discharged ink drops, and thereby the image qualities deteriorate or in the worst case a faulty-ink-discharge problem in which the ink to be discharged cannot be discharged or poorly discharged from nozzles occurs.

In addition, since the strength of the recording members using glass, silicon or silicon oxide deteriorates at junctions between the recording members, a faulty-ink-discharge problem occurs or in the worst case the junctions are broken, resulting in damage of the printer.

In particular, when the ink room of a recording head which contains an ink to be discharged is made of glass, silicon or silicon oxide, the dimensional accuracy of the ink room deteriorates due to dissolution of such a material into the ink and thereby the above-mentioned problems frequently occurs.

When the ink-flow-regulating portion of a recording head, which is the projected portion hear the ink room and which regulates the ink flow to the ink room, is made of glass, silicon or silicon oxide, the resistance to the ink given by the ink-flow-regulating portion changes due to dissolution of such a material into the ink, resulting in changes of size and discharge speed of the ink drops, and thereby the image qualities deteriorate and in the worst case the faulty-ink-discharging problem occurs.

When the vibrating plate of a recording head from which vibrates to discharge an ink drop from a nozzle is made of glass, silicon or silicon oxide, the thickness of the vibrating plate changes due to dissolution of the material into the ink, resulting in changes of size and discharge speed of the ink drops, and thereby the image qualities deteriorate, and in the worst case the vibrating plate is broken.

When the nozzles of a recording head from which ink drops are discharged are made of glass, silicon or silicon oxide, the size and discharge speed of the ink drops change or the faulty-ink-discharging problem occurs, and thereby the image qualities deteriorate.

In addition, when the material such as glass, silicon or silicon oxide is dissolved in an ink, the dispersibility and solubility of the colorant included in the ink are depressed, resulting in precipitation of the colorant, and thereby a nozzle-choking problem in which a nozzle is choked with an agglomerated colorant occurs. In addition, the glass, silicon or silicon itself dissolved in the ink is also precipitated at the surface of nozzles when the solvent (such as water) of the ink evaporates. Therefore the nozzle-choking problem occurs.

These problems have not yet been solved. Therefore, a method such that when an ink is ended, a new ink cartridge having an inkjet recording head and containing an ink is set in a printer has been performed without reusing the old inkjet recording head. Namely, inkjet recording heads have a short life.

In attempting to solve such problems, Japanese Laid-Open Patent Publication No. (hereinafter JOP) 05-155023 and WO98-42513 have disclosed a technique in which a layer of an inorganic material such as SiN, TiN and TiO or an organic material is formed on the members made of glass, silicon or silicon oxide. However, the manufacturing method therefor is complex, and therefore the resultant recording head and inkjet printer are very expensive. In addition, these layers typically have pinholes (i.e., film defects) and therefore it is hard to uniformly form such a layer without film defects. In addition, in some kinds of recording heads having a specific structure, such a layer cannot be formed. Further, it is recently found that even such a layer is dissolved in inks including specific black dyes. Furthermore, it is also found that such a layer is dissolved into other dyes at a concentration greater than a limit value when used for a long period of time.

JOP 09-123437 discloses a recording ink which includes urea which can stabilize the dissolved glass, silicon or silicon oxide in the ink. However, by using this technique, the dissolution of glass, silicon or silicon oxide cannot be prevented. Therefore even when this technique is used, glass, silicon or silicon oxide cannot be used for the recording members which are needed to be formed with a high-degree of accuracy, such as the ink room, ink-flow-regulating portion and vibrating plate.

Therefore a need exists for an ink which does not dissolve a substrate made of a material, such as inorganic materials such as glass, silicon, and silicon oxide which can be easily formed by heat-oxidizing silicon, and a substrate in which a layer made of an inorganic material such as SiN, TiN and TiO, or an organic material is formed on a substrate made of a material such as silicon or silicon oxide.

Japanese Patent Publication No. 07-51687 discloses an ink in which the content of sodium is specified. JOP 05-331391 discloses an ink in which the contents of sodium and potassium are specified. In addition, JOPs 08-333542 and 09-25441 have disclosed an ink in which the content of sodium is specified and an ink in which the content of potassium is specified, respectively.

Some of the present inventors and other inventors have proposed an ink in Japanese Patent No. 1,677,642 (i.e., JOP 62-149770), which includes a dye and a specific compound having a quaternary ammonium ion as a counter ion, and an ink in Japanese Patent No., 2,085,163 (i.e., JOP 63-048374), which includes a specific dye having a quaternary phosphonium ion as a counter ion. These proposals have been made for solving the nozzle-choking problem and kogation, and the inks have good preservation property. However, such a dissolution problem did not become obvious at that time when the applications for these patents were filed and whether or not the material such as glass, silicon and silicon oxide is dissolved by these inks has not been examined. When the present inventors evaluate these inks recently, it is found that the above-mentioned dissolution problem of the material such as glass, silicon and silicon oxide cannot be fully solved.

In addition, pigments have been used as colorants for recording inks, but pigments have a drawback such that the resultant recording inks have relatively poor discharge stability compared to that of dye inks. In attempting to solve this problem, proposals in which pigments whose surface is modified and microencapsulated pigments are used without using a dispersant which tends to cause a nozzle-choking problem have been made in JOPs 10-183003, 11-343439, 11-349870 and 2000-007961. However, in these background art, the dissolution problem in which glass, silicon and/or silicon oxide is dissolved in an ink and which is described in this application is never described, and the objects of the background art are to improve the dispersion stability, and abrasion resistance and water resistance of recorded images.

Because of these reasons, a need exists for a recording ink which can stably record high quality images for a long period of time without causing the dissolution problem, the faulty-ink-discharging problem, and the nozzle-choking problem.

SUMMARY OF THE INVENTION

Accordingly, an object of the present invention is to provide an ink composition for inkjet recording which can stably record an ink image by discharging ink drops having a uniform size and which does not cause the faulty-ink-discharging problem, the nozzle-choking problem and the dissolution problem even when the ink contacts an recording member, such as the ink room, ink-flow-regulating portion, and vibrating plate, made of a material such as glass (e.g., boron silicate glass, photosensitive glass, quartz glass, soda lime glass) and silicon (e.g., single crystal silicon and polysilicon), or a material in which a layer of an oxide such as silicon oxide, titanium oxide, and chromium oxide, a nitride such as titanium nitride and silicon nitride, a metal such as zirconium, or an organic material such as polyimides is formed on a support of silicon or glass.

Another object of the present invention is to provide an inkjet recording method and apparatus by which high quality images can be produced without causing the faulty-ink-discharging problem, nozzle-choking problem and dissolution problem even when the above-mentioned material is used for the recording member which contacts the ink used.

Briefly these objects and other objects of the present invention as hereinafter will become more readily apparent can be attained by an ink composition including a colorant and a solvent, wherein the zeta potential (hereinafter zeta potential 2) between the colorant and a material selected from the group consisting of silicon, glass, silicon oxide, titanium oxide, chromium oxide, titanium nitride, silicon nitride, zirconium and polyimide is from 0 to −50 mV at a pH of from 6.5 to 11.5.

The zeta potential of the ink itself (hereinafter referred to as zeta potential 1) at a pH of from 6.5 to 11.5 is preferably not greater than −20 mV.

The colorant is preferably covered with a resin or a particulate resin colored with a coloring agent is preferably used as the colorant.

The colorant may be microencapsulated. The shell of the microcapsule is preferably made of a hydrophilic resin. Preferably a microencapsulated pigment is used as the colorant. The average particle diameter of the microcapsule is preferably from 0.01 to 0.2 $\mu$m, and the pigment is included in the ink in an amount of from 0.1 to 10% by weight.

The ink composition preferably includes a corrosion inhibitor such as a cation or a cationic compound to adjust the zeta potentials 1 and 2. The cationic compound is preferably a cationic resin, a cationic surfactant or a cationic colorant such as cationic dyes, cationic carbon black and cationic pigments.

The cation is preferably a cation selected from the group consisting of a phosphonium ion having the following formula (1):

wherein Ra, Rb, Rc and Rd independently represent a linear, branched or ring alkyl group having 1 to 4 carbon atoms, a hydroxyalkyl group, a halogenated alkyl group, or a substituted or unsubstituted phenyl group;

a sulfonium ion having the following formula (3):

wherein Ra, Rb and Rc independently represent a linear, branched or ring alkyl group having 1 to 4 carbon atoms, a hydroxyalkyl group, a halogenated alkyl group, or a substituted or unsubstituted phenyl group;

an arsonium ion having the following formula (4):

wherein Ra, Rb, Rc and Rd independently represent a linear, branched or ring alkyl group having 1 to 4 carbon atoms, a hydroxyalkyl group, a halogenated alkyl group, or a substituted or unsubstituted phenyl group;

a beryllium ion ($Be^{2+}$); an aluminum ion ($Al^{3+}$); a zinc ion ($Zn_{2+}$), a titanium ion ($Ti^{4+}$); a zirconium ion ($Zr^{4+}$); and a silicide ion ($Si^{2+}$).

Semi-polar boron compounds can also be included in the ink composition.

The ink preferably includes an acetylene compound having the following formula (2):

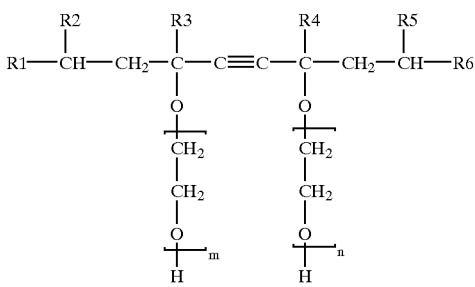

(2)

wherein R1 to R6 independently represent a linear alkyl group having from 1 to 5 carbon atoms; and m and n is 0 or an integer of from 1 to 20.

These cations and cationic compounds may be included alone or in combination.

The pH of the ink composition is preferably from 7 to 10.

The ink component of the present invention is preferably used for an inkjet printer having a recording head which includes at least an ink room, an ink-flow-regulating portion, a vibrating plate and an inkjet nozzle, wherein at least one part of each of these members is made of silicon (preferably single crystal silicon or polysilicon), glass (preferably boron silicate glass, photosensitive glass, quartz glass or soda lime glass) or a material in which a layer of an oxide (preferably silicon oxide, titanium oxide or chromium oxide), a nitride (preferably titanium nitride or silicon nitride), a metal (preferably zirconium) or an organic compound (preferably polyimide) is formed on a substrate of silicon or glass.

In another aspect of the present invention, an inkjet recording method is disclosed which includes the steps of discharging an ink from a nozzle of a recording head having at least an ink room, an ink-flow-regulating portion, a vibrating plate and the nozzle to form an ink image of a recording paper, wherein the ink is the ink of the present invention and at least one part of each of the ink room, ink-flow-regulating portion, vibrating plate and nozzle, which contacts the ink, is made of silicon (preferably single crystal silicon or polysilicon), glass (preferably boron silicate glass, photosensitive glass, quartz glass, or soda lime glass) or a material in which a layer of an oxide (preferably silicon oxide, titanium oxide or chromium oxide), a nitride (preferably titanium nitride or silicon nitride), a metal (preferably zirconium) or an organic compound (preferably polyimide is formed on a substrate of silicon or glass).

In the inkjet recording method, the ink room, ink-flow-regulating portion, vibration plate and nozzle are preferably prepared by a method selected from the group consisting of etching treatments, sand blast treatments, excimer laser treatments and drilling treatments.

In yet another aspect of the present invention, an ink cartridge is provided which includes an ink container containing the ink of the present invention.

The ink cartridge preferably may have a recording head including an ink room, an ink-flow-regulating portion, a vibrating plate and a nozzle from which the ink is discharged.

In a further aspect of the present invention, an inkjet recording apparatus is provided which includes the ink cartridge of the present invention, which includes the ink of the present invention and a carriage configured to carry the ink cartridge to form an ink image on a recording paper.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawing(s) in which like reference characters designate like corresponding parts throughout and wherein.

DETAILED DESCRIPTION OF THE INVENTION

Figure 1:
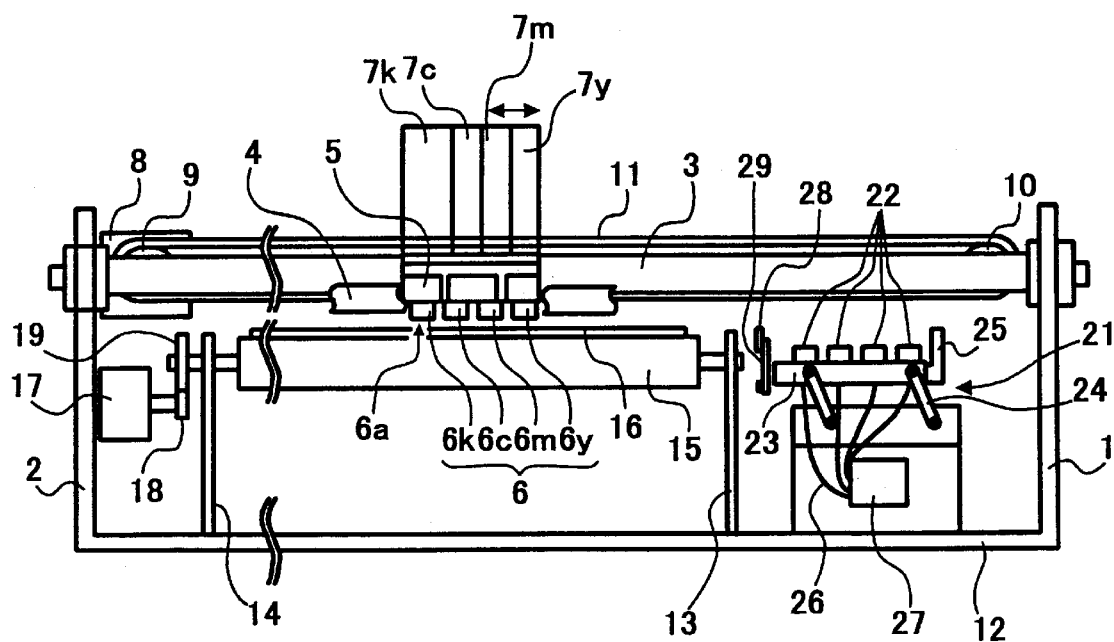
FIG. 1 is a schematic view illustrating an embodiment (a serial printer) of the inkjet recording apparatus of the present invention.

As a result of the present inventors' investigation, it is found that even if the nozzle-choking problem due to precipitation of the colorant included in the ink and the so-called "kogation" problem in that a residue of the ink used is formed on a heating element of a recording head which residue affects drop ejection can be solved by reducing the content of a specific element such as sodium and potassium in an ink, the dissolution of the material (such as glass, silicon and silicon oxide) constituting the members of the recording head, such as the ink room, ink-flow-regulating portion, vibrating plate and nozzle, which contacts the ink, cannot be prevented. The present inventors discover that by controlling the zeta potential 1 of the ink and the zeta potential 2 between the members of the recording head and the colorant in the ink so as to be in a specific range, the dissolution problem can be prevented.

Namely, it is found that by controlling the zeta potential 1 of the ink so as to be not greater than −20 mV at a pH of from 6.5 to 11.5 and/or by controlling the zeta potential 2 between the members of the recording head and the colorant in the ink so as to be in a range of from 0 to −50 mV at a pH of from 6.5 to 11.5, the dissolution of the material (such as glass, silicon and silicon oxide), which constitutes the members of the recording head, into the ink can be prevented. Thus the above-mentioned problems can be solved at the same time.

In addition, it is found that the oxidation-reduction current flowing between the members and the ink is from 0 to 1.0 $\mu A/cm^2$ (Pt.) when the oxidation-reduction current is measured at a potential width of from −2.0 V to 5.0 V against SCE (saturated calomel electrode).

The ink composition of the present invention includes a colorant; a solvent including water as a main component; a water-soluble organic solvent; and an additive such as surfactants. The zeta potential 1 of the ink is preferably controlled so as to be not greater than −20 mV by properly selecting a colorant, a water-soluble solvent and a surfactant and by controlling the contents thereof. When the zeta potential 1 is greater than the upper limit, the zeta potential 1 can be controlled so as to be in the preferable range by adding a corrosion inhibitor in the ink.

It is well known that the corrosion of glass, silicon and silicon oxide is caused by the alkali metals included in the ink used. The total content of the alkali metals included in an ink is about 800 ppm when determined by an inductively coupled plasma emission spectrochemical analysis (i.e., ICP). By adding a corrosion inhibitor in an amount of from 0.05 to 5.0% by weight, preferably from 0.1 to 2.0% by weight, and more preferably from 0.2 to 0.8% by weight, based on the total weight of the ink, the zeta potentials 1 and 2 and oxidation-reduction current can be decreased, resulting in prevention of the dissolution of the material, such as glass, silicon and silicon oxide, into the ink.

Suitable corrosion inhibitors include compounds having a phosphonium ion, acetylene compounds, cationic resins, cationic surfactants, cationic colorants, compounds having a sulfonium ion, compounds having an arsonium ion, boron compounds, and compounds having a beryllium ion ($Be^{2+}$), an aluminum ion ($Al^{3+}$), a zinc ion ($Zn^{2+}$), a titanium ion ($Ti^{4+}$), a zirconium ion ($Zr^{4+}$), and silicide ion ($Si^{2+}$).

At this point, the alkali metals are defined as the metals belonging the first group of the periodic table, i.e., lithium, sodium, potassium, rubidium, cesium, and francium. Sodium is typically included in an ink in an amount greater than the other alkali metals. In addition, since francium is hardly present in the earth, the total contents of lithium, sodium, potassium, rubidium and cesium need to be controlled.

Suitable glass for use in the recording head members contacting the ink of the present invention include known glasses, however, borosilicate glass, quartz glass, low-alkali glass, non-alkali glass, and soft glass (e.g., blue glass) are preferably used. When glass is used for recording heads in combination with another material, it is preferable to use a glass having a linear expansion coefficient similar to that of the material used in combination with the glass. For example, when a glass is used in combination with silicon, PYREX GLASS #7740, CORNING COAT 7913, COANING COAT 7052, COANING COAT 7056, etc. are preferably used as the glass.

As the glass suitable for anode junction, non-alkali glass substrates OA-2 and OA-10, a low alkali glass substrate BLC (from Nippon Electric Glass Co., Ltd.), and blue glass (soft glass) SL and NA (from HOYA Corp.), are preferably used. These glasses can be bonded with silicon. In addition, photosensitive glass can also be used. Photosensitive glass which can be anisotropically etched is more preferably used. Suitable photosensitive glasses include photosensitive glass PEG3 manufactured by HOYA Corp., and photosensitive glasses which can be anisotropically etched include photosensitive glass manufactured by Nippon Electric Glass Co., Ltd.

Alkali metals included in an ink penetrate into the material, such as glass, silicon and silicon oxide, which contacts the ink, and diffuse in the material, resulting in dissolution of the glass and silicon into the ink.

The dissolution problem can be avoided by controlling the content of alkali metals in the ink so as to be not greater than 700 ppm, preferably not greater than 150 ppm and more preferably not greater than 50 ppm. However, as mentioned above, by adding a corrosion inhibitor having a phosphonium ion having formula (1), etc. to the ink, the dissolution problem can be easily avoided even if the alkali metal content in the ink is not decreased.

The reason why such a corrosion inhibitor can prevent the dissolution problem is considered to be as follows. A corrosion inhibitor is adsorbed on the surface of the recording head members made of a material such as glass, silicon and silicon oxide and remains on the surface. Therefore continued dissolution of glass and silicon cannot be performed even when the alkali metal content is high, and thereby the dissolution problem can be avoided.

This theory can be supported by the following experimental results. When an ink including a corrosion inhibitor contacts glass or silicon, the zeta potential of the ink is different from that of the ink not including the corrosion inhibitor. Namely, it is said that the corrosion inhibitor remains on the surface of the glass or silicon. When a substrate (e.g., a glass or silicon substrate) has a high zeta potential, the substrate has highly hydrophilic property, highly ionic property, and high reactivity, namely the substrate is unstable. To the contrary, when a substrate has a low zeta potential (i.e., a highly negative potential), the substrate has a high water repellent property, nonionic property, and low reactivity. When a cationic compound (e.g., the compounds mentioned below) is adsorbed on a substrate having a highly negative potential, the potential decreases, resulting in stabilization of the system. In this case, the lower the zeta potential (i.e., the lower the ionic property), the less the oxidation-reduction current.

As can be understood from the above-description, by measuring the zeta potential 2 and oxidation-reduction current between the substrate and ink contacting the substrate and the zeta potential 1 of the ink itself, the possibility of corrosion of the substrate can be quantitatively determined. Namely, by controlling the zeta potential 2 and oxidation-reduction current between the substrate and ink contacting the substrate and the zeta potential 1 of the ink itself, the corrosion of the substrate can be prevented.

Suitable cations for use in the ink of the present invention include sulfonium, ammonium, phosphonium, arsonium, beryllium ($be^{2+}$), aluminum ($Al^{3+}$), zinc ($Zn^{2+}$), titanium ($Ti^{4+}$), zirconium ($Zr^{2+}$) and silicide ($Si^{2+}$) ions. Compounds having one or more of these ions can be used alone or in combination.

Suitable cationic compounds for use in the ink of the present invention include cationic resins, boron compounds, acetylene compounds, etc. These compounds can be used alone or in combination, and in addition these compounds can be used in combination with the compounds having the above-mentioned cations.

Among the compounds having a phosphonium ion represented by formula (1), compounds having a phosphonium ion having the following formula No. 1, No. 2, No. 3 or No. 4 are preferably used because they can excellently prevent the dissolution of glass, silicon and silicon oxide, excellently disperse or dissolve the colorant used and impart good properties to the ink.

No. 1

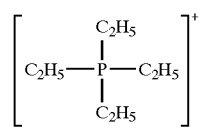

No. 2
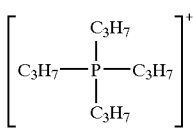
No. 3
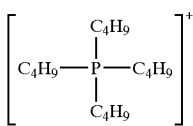
No. 4
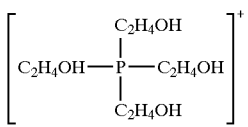
In addition, compounds having one or more of the following phosphonium ions (No. 5 to No. 26) can also be used as the compound having formula (1).
No. 5
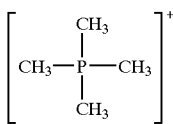
No. 6
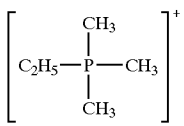
No. 7
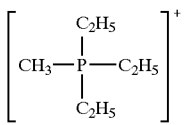
No. 8
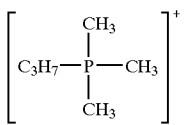
No. 9
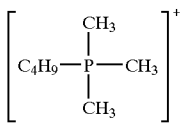
No. 10
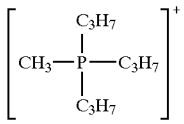
No. 11
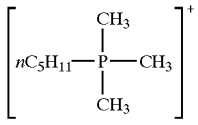
No. 12
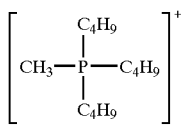
No. 13
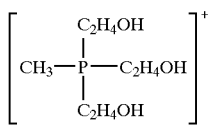
No. 14
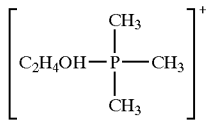
No. 15
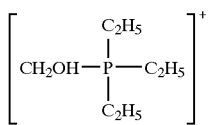
No. 16
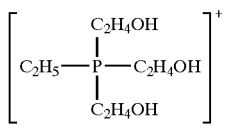
No. 17
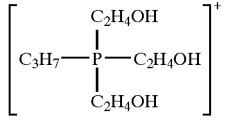
No. 18
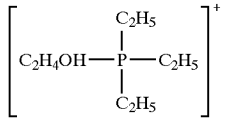
No. 19
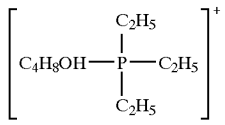
No. 20
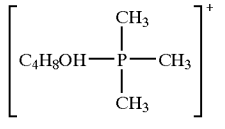
No. 21
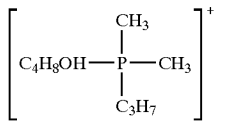
No. 22
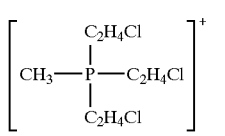

-continued

No. 23
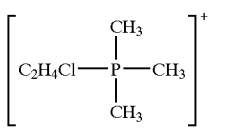

No. 24
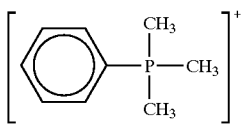

No. 25
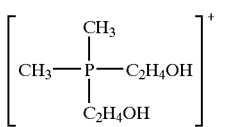

No. 26
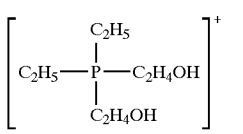

Among the compounds having a sulfonium ion represented by formula (3), compounds having a sulfonium ion having the following formula No. 27, No. 28, No. 29 or No. 30 are preferably used because they can excellently prevent the dissolution of glass, silicon and silicon oxide, excellently disperse or dissolve the colorant used and impart good properties to the ink.

No. 27
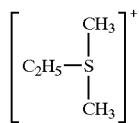

No. 28
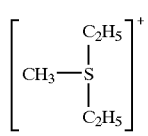

No. 29
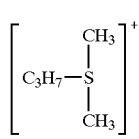

No. 30
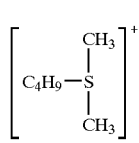

In addition, compounds having one or more of the following sulfonium ions (No. 31 to No. 50) can also be used as the compound having formula (3).

No. 31
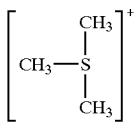

-continued

No. 32
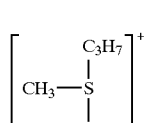

No. 33
(image not referenced in list)

No. 34
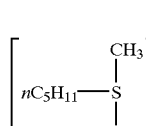

No. 35
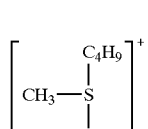

No. 36
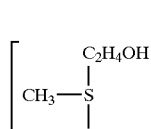

No. 37
(image)

No. 38
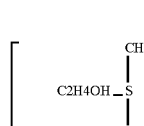

No. 39
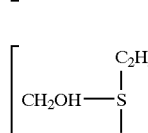

No. 40
(image)

No. 41
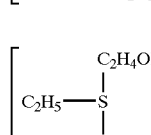

No. 42
(image)

-continued

No. 43
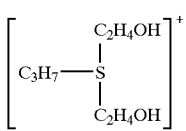

No. 44
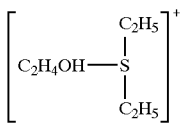

No. 45
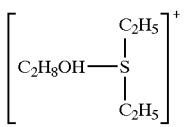

No. 46
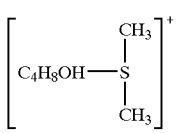

No. 47
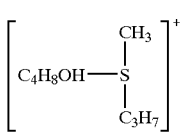

No. 48
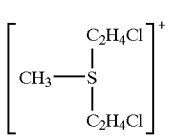

No. 49
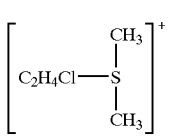

No. 50
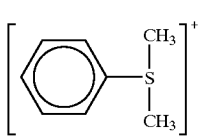

Among the compounds having an arsonium ion represented by formula (4), compounds having an arsonium ion having the following formula No. 51, No. 52, No. 53 or No. 54 are preferably used because they can excellently prevent the dissolution of glass, silicon and silicon oxide, excellently disperse or dissolve the colorant used and impart good properties to the ink.

No. 51
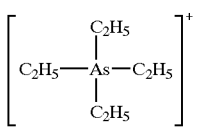

No. 52
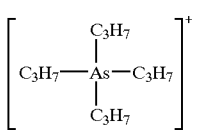

-continued

No. 53
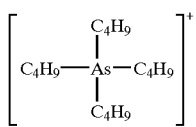

No. 54
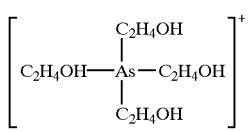

In addition, compounds having one or more of the following arsonium ions (No. 55 to No. 76) can also be used as the compound having formula (4).

No. 55
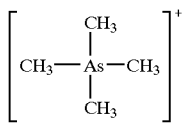

No. 56
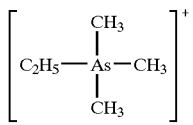

No. 57
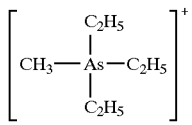

No. 58
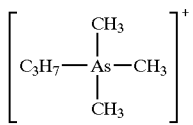

No. 59
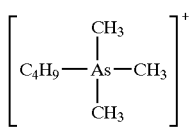

No. 60
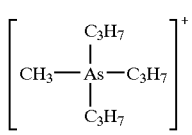

No. 61
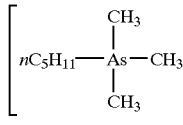

No. 62

No. 63 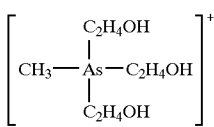

No. 64 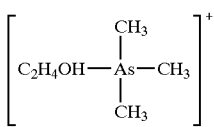

No. 65 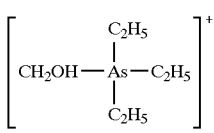

No. 66 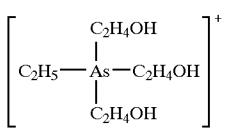

No. 67 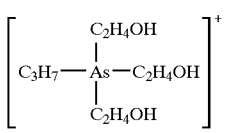

No. 68 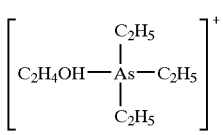

No. 69 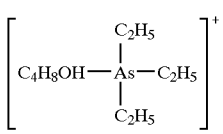

No. 70 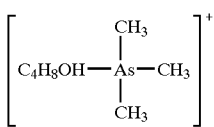

No. 71 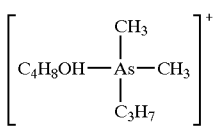

No. 72 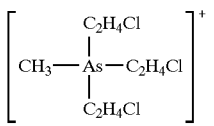

No. 73 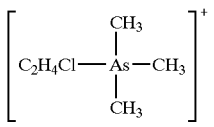

No. 74 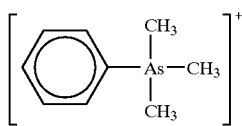

No. 75 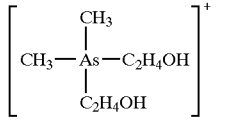

No. 76 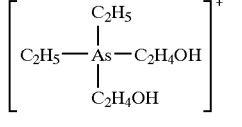

The ions having formula (1), (3) or (4) are not limited formulae No. 1 to No. 76.

One or more compounds having one or more of these ions are included in the ink of the present invention such that the resultant ink fulfills the requisites for recording inks and does not produce an adverse effect such as pollution.

The number of carbon of the compounds having an ion having formula (1), (3) or (4) is preferably from 4 to 12. When the carbon number is too large, solubility to water decreases and therefore a nozzle-choking problem in that a nozzle of an inkjet printer is choked with the deposition of the compounds occurs when images are recorded or the image recording operations are stopped. In addition, when the ink is preserved, a problem such that one or more components of the ink separate from the other components or precipitate in the ink tends to occur.

According to the present invention, the corrosion of the material such as glass, silicon and silicon oxide constituting members of a recording head contacting the ink can be avoided even when the ink includes a large amount of alkali metals. However, when anionic compounds which are salts of an alkali metal such as sodium or potassium are used as an ink constituent such as colorants, penetrants, dispersants and surfactants, the content of alkali metals in the ink becomes much greater than 800 ppm. In such a case, it is preferable to partially or perfectly change the counter ion of the anionic compounds to an ion other than alkali metal ions, to reduce the alkali metal content.

Suitable ion exchanging methods are as follows:
Direct Ion Exchanging Methods
(1) an ion exchanging method using an ion exchanging resin; and
(2) a salting method in which a salt having an onium ion such as ions having formula (1), (3) or (4) is added to a solution of a salt including an alkali metal such as sodium to precipitate an alkali metal salt to be removed.
Ion Exchanging Methods in which Salt Including Alkali Metal Ion is Changed to Onium Ion Through Free Acid
(1) a method using an ion exchanging method; and
(2) a method in which a strong acid is added to an anionic compound from which an alkali metal is to be removed and then the salts are removed by a method such as solvent extraction methods and filtering methods.

When anionic compounds having a counter ion other than alkali metals are used for the ink, the anionic compounds can be used after or without being treated with one of the ion exchanging methods mentioned above.

In addition, a part of the alkali metal ions may be exchanged with an onium ion having formula (1), (3) or (4).

When the latter method is used (i.e., a free acid is formed), the prepared free acid type anionic compounds themselves may be used, and a part of the hydrogen ions of the free acid type anionic compound may be exchanged with an ion other than alkali metals, preferably with an onium ion having formula (1), (3) or (4).

Specific examples of the method of adding an onium ion to an ink include the following methods:

(i) Method in which pH Controlling Agent Having Onium Ion is Added to Ink

An onium ion can be added in an ink by adding a pH controlling agent such as onium hydroxide and onium carbonate. Onium hydroxide and onium carbonate have almost the same acid-base dissociation constant as sodium hydroxide and sodium carbonate, respectively, and therefore pH controlling of an ink can be performed using an onium hydroxide and onium carbonate similarly to the case using sodium hydroxide and sodium carbonate.

(ii) Method in which Dye Including Onium Ion as Counter Ion is Added to Ink

An onium ion is added to an ink so as to be a counter ion of a dye having an acid group such as —$SO_3H$, —COOH and —OH. Suitable method of adding an onium ion include the following:

(A) Acid-out Method

This method can be used for a dye which precipitates in its dye solution when the pH of the solution is decreased. Namely, a dye having a cation such as a sodium ion other than onium ions is dissolved in a solvent and then the dye solution is mixed with an acid such as hydrochloric acid, sulfuric acid, acetic acid and nitric acid to precipitate a dye having an acid group (i.e., a dye in a free-acid form). This reaction is expressed as follows:

$$D^-M^+ + H^+X^- \rightarrow DH\downarrow + M^+X^-$$

wherein $D^-M^+$ represents a dye; $M^+$ represents a cation such as a sodium, ammonium or potassium; $X^{31}$ represents a nonion such as $Cl^{31}$, $NO_3^-$, $SO_4^{2-}$, $CH_3COO^-$.

The precipitated compound is separated therefrom by a filtering method and the filtered compound is washed to remove the impurity (i.e., $M^+X^-$). The thus prepared dye is dissolved in an onium hydroxide to prepare an ink. This reaction is expressed as follows:

$$DH + [R_1R_2R_3R_4P]^+OH^- \rightarrow D^-[R_1R_2R_3R_4P]^{30} + H_2O.$$

(B) Salt-out Method

A dye which is dissolved in water, or a mixture solvent such as water-ethanol, water-methanol, and water-acetone is mixed with an onium salt such as onium chlorides, onium acetates and onium sulfates, to precipitate an onium salt of the dye. Namely this reaction is expressed as follows:

$$D^-M^+ + [R_1R_2R_3R_4P]^{30}X^- \rightarrow D^-[R_1R_2R_3R_4P]^+\downarrow + M^+X^-.$$

The thus prepared precipitate is separated by filtering and then washed with a solvent such as solvents mentioned above to remove the salt ($M^+X^-$). This dye can be used for the ink of the present invention without being subjected to a further treatment.

(C) Ion Exchanging Method

A dye solution is passed through a resin or a film, which has a cation exchanging ability to directly form an onium salt. Alternatively, an onium salt can be prepared, for example, by the above-mentioned acid-out method in which the dye is first changed to a compound in a free acid form and then changed to the onium salt using onium hydroxide.

a) A dye solution is passed through an ion exchanger having an onium ion as the ion exchanging group. This reaction is expressed as follows:

$$R^-[R_1R_2R_3R_4P]^+ + D^-M^+ \rightarrow R^-M^+ + D^-[R_1R_2R_3R_4P]^+.$$

wherein $R^-$ represents the ion exchanging group of the ion exchanging resin or film.

b) A dye solution is passed through an ion exchanger in a $H^+$ form. This method is particularly suitable for acid dyes whose acid form compounds typically have good solubility.

$$R^-H^+ + D^-M^+ \rightarrow D^-H^+ + R^-M^+$$

(D) Method in which Onium Salt is Added in Dye Synthesis Step

An onium salt is used when a dye is synthesized. For example, an acid compound, which is a raw material of the dye, is dissolved using an onium hydroxide instead of sodium hydroxide which is conventionally used. Alternatively, $NaNO_2$ which is conventionally used for diazotization may be replaced with a compound, $[R_1R_2R_3R_4P] + NO_2$. Alternatively, NaOH or $Na_2CO_3$ which is conventionally used for alkali coupling reactions may be replaced with an onium salt.

(E) Extraction Method

This method utilizes difference in solubility between $D^-M^+$ and $D^-[R_1R_2R_3R_4P]^+$ or $D^-H^+$ in a specific solvent. The thus obtained $D^-[R_1R_2R_3R_4P]^+$ is used for the ink. For example, a dye $D^-M^+$ is dissolved in a solvent and then the mixture is mixed with an onium salt. Then the solvent of the solution is evaporated to obtain a mixture of an onium salt of the dye and a salt including an alkali metal. The mixture is subjected to Soxhlet's extraction using an organic solvent such as methanol to obtain the onium salt of the dye which has a high solubility to methanol.

(iii) Method in which Compound (other than dyes) Having Onium Ion as Counter Ion is Added to the Ink (A) Electric Conductivity Controlling Agent NaCl, LiCl, $Na_2SO_4$, $NaNO_3$, etc. are conventionally used as an electric conductivity controlling agent, but by using an onium salt as the electric conductivity controlling agent, the onium ion can be included in the ink.

(B) Antiseptic Agent

Sodium dehydroacetate, sodium benzoate, 2-pyridinethiol oxide sodium salt, 1,2-benzisothiazaline-3-one sodium salt, etc. are conventionally used as an antiseptic agent, but by adding an onium salt of such compounds (i.e., the sodium ion is replaced with an onium ion), the onium ion can be included in the ink.

(C) Surfactant

By using an onium salt of an anionic surfactant instead of anionic surfactants having an alkali metal ion such as sodium dodecylbenzenesulfonate, the onium ion can be included in the ink.

(D) Chelating Agent

By using an onium salt instead of a trisodium salt of EDTA, the onium ion can be included in the ink.

When an onium ion is added to an ink composition, the method in which onium hydroxide or onium carbonate is added as a pH controlling agent, or the method in which an onium ion is added as a counter ion of a dye having an acid group such as sulfonate group or carboxyl group is preferably used. In both cases, almost all the oniumions dissociate in the ink, resulting in formation of the ion, $[R_1R_2R_3R_4P]^+$. However, the quantity of onium ion present in an ink is largest in the case in which a dye having an onium ion as a counter ion is used. It is preferable that the contents of ions (such as $Na^+$, $K^+$ and $NH_4^+$) other than the onium ions are as small as possible to effectively exert the effects of the present invention. Therefore it is preferable that a dye having an onium ion as a counter ion is used as a colorant, which can be prepared by exchanging the counter ion (cation) with an onium ion using one of the methods mentioned above or the like method.

When anionic compounds in a free-acid form can be obtained, the anionic compounds can be used without performing the counter ion exchanging treatment. Namely, an onium ion having formula (1) is added to an anionic compound in a free-acid form in an amount of not less than 30% and preferably not less than 50% by equivalence ratio to control the pH of the ink so as to be from 6.5 to 11.5. Thus an anionic compound having the counter ion mentioned above can be easily included in the ink, namely the ink can be easily manufactured, resulting in reduction of the ink cost. Thus an ink which does not cause the dissolution problem can be easily prepared.

When the counter ion is the onium ion having formula (1), (3) or (4), the compound preferably has substituted or unsubstituted alkyl groups such that the total carbon number of the alkyl groups is from 4 to 12. As mentioned above, the carbon number is too large, the solubility of the compound to water decreases and therefore a nozzle-choking problem in that a nozzle of an inkjet printer is choked with the deposition of the compound occurs when images are recorded or the image recording operations are stopped. In addition, when the ink is preserved, a problem such that one or more components of the ink separate from the other components or precipitate in the ink tends to occur.

As the counter ion of the onium salts having formula (1), (3) or (4), any inorganic anions such as halogen inons, a nitrate ion, a nitrite ion, a phosphate ion and a sulfate ion, and organic anions such as a formate ion, an acetate ion, a propionate ion, a butyrate ion, a valerate ion, a glycolate ion, a gluconate ion, and lactate, can be used. However, it is preferable that the ion dissociates in water at high rates. Therefore, a monovalence anion such as halogen ions, a nitrate ion, a nitrite ion, an acetate ion and a hydroxyl ion is preferable from this viewpoint. In particular, the hydroxyl ion is more preferable.

A sulfonium salt for use in the present invention can be synthesized by the method as described below using a reaction formula. Namely, when a sulfur compound is reacted with a halogenated alkyl compound in a solvent while heated, a sulfonium salt is synthesized. Then the sulfonium salt is subjected to an ion exchanging treatment to prepare a sulfonium salt having a desired counter ion. For example, when dimethyl sulfide is reacted with chlorobenzene in acetonitrile, a compound having the following formula No. 50 is formed. Then the compound is subjected to salt changing treatment using sodium hydroxide to form a sulfonium salt having a hydroxyl group as the counter ion.

When a phosphonium salt or an arsonium salt is synthesized, the sulfur compound described in the following reaction formulae is merely replaced with a phosphor compound or arsenic compound.

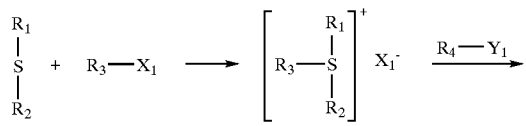

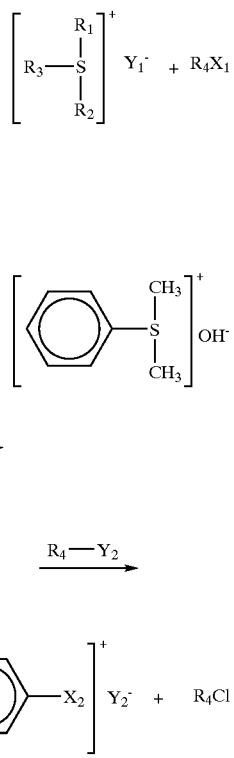

wherein $X_1^-$ and $X_2^-$ are defined above, and $Y_1^-$ and $Y_2^-$ represent a counter ion replacing the ion $X_1^-$ or $X_2^-$.

With respect to the ion X, as the position of the ion X moves to the left side in the formula, the ion X strongly receives influence from the electron accepting group, and therefore the ion X has stronger cationic property. Therefore the adhesion of the compound to a silicon substrate is enhanced, and thereby the corrosion preventing effect can be enhanced.

The same effects as these exerted by the onium ions can be produced by adding a cationic resin such as polyallylamine or polyethyleneimine in an amount of about 1%. In addition, acetylene surfactants (e.g., OLFIN B or P, or SURFINOL 61), which have both a cylindrical electron cloud (i.e., π-electron) and an active hydrogen atom of a hydroxyl group in the vicinity of the electron cloud are oriented on the surface of a material such as glass and silicon or form a complex on the surface, and therefore the same effects as those exerted by the onium ions can be exerted.

Specific examples of the cationic compounds include dicyandiamide-formalin polycondensation products, dicyandiamide-diethylenetriamine polycondensation products, epichlorohydrin-dimethylamine addition polymerization products, dimethylallylammonium chloride-sulfur dioxide copolymerization products, dimethylallylammonium chloride polymerization products, an allyamine salt of diallylamine salt-sulfur dioxide copolymers, polymers of an allylamine salt, dialkylaminoethyl(meth)acrylate quaternary ammonium salt, polyallylamine, cationic epoxy resins, polyethylene imine, polyacrylamide, poly(meth)acrylate, polyvinylformamide, aminoacetalized polyvinylalcohol, polyvinylpyridine, polyvinylbenzylonium, cationic emulsions, etc.

Specific examples of marketed products of such cationic compounds include SUNSTAT E-818, SUNFIX 70, SUNFIX 555C, SUNFIX LC-55, SUNFIX PAC-700 CONC, SANYOERION A-3, SUNFIX 414, SUNFIX 555, SUNFIX PRO-100, SUNFIX 555US, and CELLOPOL YM-500 (all of which are manufactured by Sanyo Chemical Industries, Ltd.); #675, #FR-2P and #1001 (all of which are manufactured by Sumitomo Chemical co., Ltd.); LUPASOL SC61B manufactured by BASF; etc.

In addition, the following marketed products can also be used:

ZP-700 (vinylformamide), MP-184 (polyacrylate), MP-173H (polymethacrylate), MP-180 (polymethacrylate), MX-0210 (polymethacrylate), MX-8130 (polyacrylate), E-395 (polyacrylate), E-305 (polyacrylate), Q-105H (dicyandiamide polymer), and NEO-600 (polyacrylamide), which are manufactured by HYMO Co. Ltd.; SUPER-FLOCK 2490 (polyacrylic acid salt), SUPERFLOCK 3180, 3380, 3580, 3880, 3390, 3590, 3500 and SD2081 (all of which are polyacrylamide), ACOFLOCK C498T and C498Y (all of which are polyacrylate), SUPERFLOCK 1500, 1600, and ACOFLOCK C481, C483, C485, C488 and C480 (all of which are plymethacrylate), which are manufactured by MITSUI CYTEC LTD.); PAS-A-1, PAS-A-5, PAS-A-120L, PAS-A-120S, PSA-J-81, PAS-880 and PAS-92 (all of which are diallyldimethylammonium salt copolymerization products), PAS-H-5L, PAS-H-10L and PAS-M-1 (all of which are diallyldimethylammonium salt polymerization products), PAA-HC1-3L and PAA-HC1-10L (all of which are polyallylamine hydrochloride), and PAA-10C (polyallylamine), all of which are manufactured by Nitto Boseki Co., Ltd.; Q-101 (polyamine), Q-311 (polyamine), and Q-501 (polyamine), which are manufactured by HYMO Co. Ltd.; ACOFLOCK C567, C573, C577 and C581 (all of which are a polyamine), which are manufactured by MITSUI CYTEC LTD.; etc.

Specific examples of the marketed cationic emulsions include ACRYT UW319-SX, ACRYT RKW-460, ACRYT RKW-400SX, ACRYT RKW-450SX and ACRYT RKW-450 which are manufactured by Taisei Kako Co., Ltd.

These cationic resins and cationic emulsions can be used alone or in combination.

Specific examples of the marketed acetylene compounds include SURFINOL 104E, 104H, 104A, 104BC, 104PA, 104S, 420, 440, 465, 485, SE, SE-F, 504, DF110D, DF110L, DF37, DF58, DF75, DF210, CT111, CT121, CT131, CT151, TG, GA and 61; OLFIN B, P, Y, A, STG, SPC, E1004, E1010, AK-02; etc., which are manufactured by Nisshin Chemical Industry Co., Ltd.

Specific examples of the boron compounds for use in the ink composition of the present invention include triisopropyl borate, triethyloxonium tetrafluoroborate, triethyl borate, tributylborate, tri-tert-butylborate, tri-iso-propylborate, trimethyl borate, etc.

Specific examples of the boron surfactants include a boron-containing surfactant EMULBON (manufactured by Toho Chemical Industry Co., Ltd.) having the following formula No. 77; diglycerin borate manufactured by Boron International Co. and having the following formula No. 78; etc.

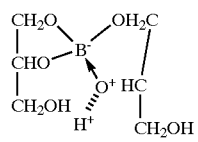

No. 77

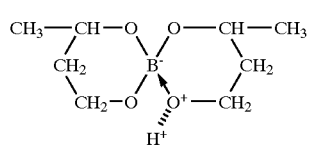

No. 78

These semipolar boron compounds are organic boron compounds having both a positive (+) polarity and a negative (−) polarity. Boron compounds having a bond, B—O, form a plane structure having a bond angle of 120° in general because boron has a coordination number of 3. However, these semipolar boron compounds have a tetrahedral structure because the boron bonding attracts an electron donating group.

The surface of the recording members of a recording head, which are made of glass or silicon, typically has a negative charge, and therefore the boron compounds form a layer having a negative charge on the surface of the recording members, wherein the layer and the recording members repulse each other. Therefore the dissolution problem of glass and silicon can be prevented.

Specific examples of the compounds having a beryllium ion ($Be^{2+}$), an aluminum ion ($Al^{3+}$), a zinc ion ($Zn^{2+}$), a titanium ion ($Ti^{4+}$), a zirconium ion ($Zr^{4+}$) or a silicide ion ($Si^{2+}$) include the following compounds but are not limited thereto.

Compounds Having a Beryllium Ion

Beryllium oxide, beryllium hydroxide, beryllium sulfate tetrahydrate, etc.

Compounds Having an Aluminum Ion

Aluminum acetylacetate, aluminum isopropylate, aluminum isopropoxide, aluminum ethylate, aluminum ethoxide, aluminum triisopropoxide, aluminum triethoxide, aluminum tri-n-butoxide, aluminum tri-sec-butoxide, aluminum tri-tert-butoxide, aluminum trimethoxide, aluminum n-butylate, aluminum sec-butylate, aluminum n-butoxide, aluminum sec-butoxide, aluminum tert-butoxide, etc.

Compounds Having a Zinc Ion

Zinc chloride, zinc chloride ammonium, zinc chloride diethyl ether complex, zinc oleate, zinc formate dihydrate, zinc citrate, zinc acetate dihydrate, zinc salicylate trihydrate, zinc oxalate dihydrate, zinc tartrate, zinc nitrate hexahydrate, zinc trifluoromethanesulfonate, etc.

Compounds Having a Titanium Ion

Cyclopentadiethyl titanium trichloride, dicyclopentadiethyl titanium, titanium isopropylate, titanium isopropoxide, titanium ethylate, titanium tetraisopropoxide, titanium tetraethoxide, titanium tetra-n-butoxide, titanium tetrapropoxide, titanium n-butylate, titanium n-butoxide, etc.

Compounds Having a Zirconium Ion

Zirconium acetylacetate, zirconium isopropoxide, zirconium tetraisopropoxide, zirconium tetra-n-butoxide, zirconium propylate, zirconium isopropylate, etc.

Compounds Having a Silicide Ion

Tetramethyammonium silicide, ethyl silicide, tetraethyl orthosilicide, tetraethyl silicide, ammonium hexafluorosilicide, etc.

The pH of the ink in which these additives are included is preferably from 7 to 10, more preferably from 7 to 9, and even more preferably from 7 to 8, not to cause the dissolution problem of the material such as glass and silicon.

As the solvent of the ink composition of the present invention, water is preferably used as a main component. In order to control the physical properties of the ink, to prevent the ink from drying or to improve the stability of the ink, water-soluble organic solvents can be used for the ink.

Specific examples of such water-soluble organic solvents include polyhydric alcohols such as ethylene glycol, diethylene glycol, triethylene glycol, polyethylene glycol, polypropylene glycol, 1,5-pentanediol, 1,6-hexanediol, glycerin, 1,2,6-hexanetriol, 1,2,4-butanetriol, 1,2,3-butanetriol, and petriol; alkyl ethers of polyhydric alcohols such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; aryl ethers of polyhydric alcohols such as ethylene glycol monophenyl ether, and ethylene glycol monobenzyl ether; nitrogen-containing alicyclic compounds such as N-methyl-2-pyrrolidone, N-hydroxyethyl-2-pyrrolidone, 2-pyrrolidone, 1,3-dimethylimidazolidinone, and ε-caprolactam; amines such as monoethanol amine, diethanol amine, and triethanol amine; sulfur-containing compounds such as dimethyl sulfoxide, sulforane, and thiodiethanol; propylene carbonate, ethylene carbonate, γ-butyrolactone, etc.

One or more of these solvent can be used alone or in combination, together with water.

Among these compounds, diethylene glycol, thiodiethanol, polyethylene glycol 200 to 600, triethylene glycol, glycerin, 1,2,6-hexanetriol, 1,2,4-butanetriol, petriol, 1,5-pentanediol, N-methyl-2-pyrrolidone, N-hydroxyethyl pyrrolidone, 2-pyrrolidone, and 1,3-dimethylimidazolidinone are preferably used. By using such compounds, occurrence of the nozzle-choking problem due to evaporation of water in the ink can be prevented and the stability of the ink composition can be improved.

As the colorant for use in the ink composition of the present invention, known colorants can be used if the content of alkali metals in the colorant is not greater than about 1000 ppm. It is preferable that the colorants are subjected to the above-mentioned treatment by which the content of alkali metals is decreased.

Water-soluble dyes include dyes classified into acid dyes, direct dyes, basic dyes, reactive dyes and food dyes in color index. It is preferable to use dyes having good water resistance and light resistance as the colorant of the ink of the present invention.

Specific examples of acid dyes and food dyes include C.I. Acid Yellow 17, 23, 42, 44, 79 and 142; C.I. Acid Red 1, 8, 13, 14, 18, 26, 27, 35, 37, 42, 52, 82, 87, 89, 92, 97, 106, 111, 114, 115, 134, 186, 249, 254 and 289; C.I. Acid Blue 9, 29, 45, 92 and 249; C.I. Acid Black 1, 2, 7, 24, 26 and 94; C.I. Food Yellow 3 and 4; C.I. Food Red 7, 9 and 14; and C.I. Food Black 1 and 2.

Specific examples of the direct dyes include C.I. Direct Yellow 1, 12, 24, 26, 33, 44, 50, 86, 120, 132, 142 and 144; C.I. Direct Red 1, 4, 9, 13, 17, 20, 28, 31, 39, 80, 81, 83, 89, 225 and 227; C.I. Direct Orange 26, 29, 62 and 102; C.I. Direct Blue 1, 2, 6, 15, 22, 25, 71, 76, 79, 86, 87, 90, 98, 163, 165, 199 and 202; and C.I. Direct Black 19, 22, 32, 38, 51, 56, 71, 74, 75, 77, 154, 168 and 171.

Specific examples of the basic dyes include C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87 and 91; C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109 and 112; C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147 and 155; and C.I. Basic Black 2 and 8.

Specific examples of the reactive dyes include C.I. Reactive Black 3, 4, 7, 11, 12 and 17; Reactive Yellow 1, 5, 11, 13, 14, 20, 21,22, 25, 40, 47, 51, 55, 65 and 67; C.I. Reactive red 1, 14, 17, 25, 26, 32, 37, 44, 46, 55, 60, 66, 74, 79, 96 and 97; and C.I. Reactive Blue 1, 2, 7, 14, 15, 23, 32, 35, 38, 41, 63, 80 and 95.

In the recording ink for use in the present invention, acid dyes and direct dyes are preferably used. In addition, dyes developed for ink jet inks can be preferably used. Specific examples of such dyes include PROJECT FAST BLACK 2, PROJECT FAST MAGENTA 2, PROJECT FAST YELLOW 2, and PROJECT FAST CYAN 2, which are manufactured by Avecia.

Suitable pigments for use as the colorant in the recording ink include known inorganic pigments and organic pigments.

Specific examples of the inorganic pigments include titanium oxide, iron oxide, calcium carbonate, barium sulfate, aluminum hydroxide, barium yellow, cadmium red, chrome yellow, and carbon blacks manufactured by a known method such as contact methods, furnace methods and thermal methods. Specific examples of the organic pigments include azo pigments (which include azo lakes, insoluble azo pigments, condensed azo pigments, chelated azo pigments, etc.), polycyclic pigments (for example, phthalocyanine pigments, perylene pigments, perynone pigments, anthraquinone pigments, quinacridone pigments, dioxadine pigments, indigo pigments, thioindigo pigments, isoindolinone pigments, quinophthalone pigments, etc.), dye chelates (for example, basic dye chelates, acidic dye chelates, etc.), nitro pigments, nitroso pigments, aniline black, etc.

Among these pigments, pigments which have good affinity with the solvent used in the ink composition are preferably used. The content of the pigment serving as the colorant in the ink of the present invention is preferably from 0.5 to 25% by weight, and more preferably from 2 to 15% by weight.

Specific examples of the black pigments include carbon black (C.I. Pigment Black 7) such as furnace black, acetylene black and channel black; metal and metal compounds such as copper, iron (C.I. Pigment Black 11), and titanium oxide; and organic pigments such as Aniline Black.

Specific examples of the color pigments include C.I. Pigment Yellow 1, 3, 12, 13, 14, 17, 24, 34, 35, 37, 42 (i.e., yellow iron oxide), 53, 55, 81, 83, 95, 97, 98, 100, 101, 104, 408, 109, 110, 117, 120, 138 and 153; C.I. Pigment Orange 5, 13, 16, 17, 36, 43 and 51; C.I. Pigment Red 1, 2, 3, 5, 17, 22, 23, 31, 38, 48:1, 48:2 (Permanent Red 2B(Ca)), 48:3, 48:4, 49:1, 52:2, 53:1, 57:1 (Brilliant Carmine 6B), 60:1, 63:1, 63:2, 64:1, 81, 83, 88, 101 (red iron oxide), 104, 105, 106, 108 (Cadmium Red), 112, 114, 122 (Quinacridone Magenta), 123, 146, 149, 166, 168, 170, 172, 177, 178, 179, 185, 190, 193, 209 and 219; C.I. Pigment Violet 1 (Rhodamine Lake), 3, 5:1, 16, 19, 23 and 38; C.I. Pigment Blue 1, 2, 15 (Phthalocyanine Blue), 15:1, 15:2, 15:3 (Phthalocyanine Blue), 16, 17:1, 56, 60 and 63; C.I. Pigment Green 1, 4, 7, 8, 10, 17, 18 and 36; etc.

In addition, grafted pigments whose surface is treated with a resin so as to be easily dispersed in water; and process pigments which are prepared by adding a functional group such as a sulfonate group or a carboxyl group on the surface thereof so as to be easily dispersed in water can also be used. Further, pigments which are microencapsulated so as to be easily dispersed in water can also be used.

The average particle diameter of the pigments is preferably from 50 nm to 200 nm. At this point, the average particle diameter means the median value (i.e., the 50% value) of the cumulative volume in the volume particle diameter distribution of the particles. This average particle diameter can be measured by, for example, a dynamic light scattering method (i.e., Doppler scattering light analysis) in which laser light irradiates a particle, which performs Brownian motion in the ink, to determine the difference in frequency of the light (back scattering light) returning from the particle and the irradiated light, by which the particle diameter of the particle can be determined.

In the ink composition of the present invention, the colorant is preferably covered with a resin, or particulate resins colored with a colorant (i.e., dyes or pigments) are preferably used as the colorant so that the dissolution of the material constituting the recording members, such as glass and silicon is prevented. The reason is considered to be as follows. For example, when a carbon black is used as a colorant, impurities such as acids included in the carbon black dissolve the material (i.e., glass and silicon). By covering such a colorant with a resin or using colored resin particles, the dissolution problem can be prevented.

The colorant of the ink composition of the present invention may be microencapsulated. By using a microencapsulated colorant while the zeta potential 1 of the ink is maintained so as to be not greater than −20 mV, the nozzle-choking problem can be avoided and in addition the resultant images have good resistance to light, chemicals and abrasion even when used for plain papers.

The microencapsulated colorant will be explained in detail. The microencapsulated colorants can be made, for example, by microencapsulating a hydrophobic colorant such as pigments and oil-soluble dyes with a hydrophilic resin. The thus prepared microencapsulated colorants can be easily dispersed in water. By using such microencapsulated colorants in an ink, dissolution of the material (such as glass, silicon and silicon oxide), which contacts the ink, can be avoided.

The reason why the dissolution problem can be solved by using a microencapsulated colorant in the present invention is not clear. However, it is considered as follows. When the surface of a pigment used in an ink in which the pigment is dispersed by a dispersant adsorbed on the pigment electrically contacts the recording members made of a material such as silicon and silicon oxide, the material is dissolved in the ink if the dispersant is released from the pigment (i.e., if the surface of the pigment is exposed). When a pigment is microencapsulated, the pigment is not electrically contacted with the recording members because the pigment is electrically insulated from the members by the shell of the microcapsule, resulting in prevention of the dissolution problem. In addition, since the pigment is covered with a resin shell, the pigment has high fixability and a high cohesive force when the pigment is adhered to a recording material, and thereby images having good resistance to light, chemicals and abrasion and good brightness can be formed.

When the zeta potential 1 of the dispersed particles in the ink is not greater than −20 mV (i.e., the absolute value of the negative zeta potential is not less than 20 mV), the dissolution problem can be effectively prevented. This is because the material such as glass, silicon and silicon oxide has a negative zeta potential and therefore repulses the microencapsulated colorant, which also has a negative polarity, and thereby contact of the colorant with the material can be prevented. When the zeta potential 1 of the microencapsulated colorant is too high (i.e., the absolute value of the negative zeta potential is less than 20 mV), the possibility that the colorant contacts the material increases, and therefore the dissolution problem tends to occur if the colorant is not perfectly microencapsulated. In addition, repulsion between the dispersed particles (i.e., the microencapsulated colorants) decreases, resulting in generation of agglomerated particles, and thereby the nozzle-choking problem tends to occur.

In order to stably disperse microencapsulated colorants in water, the following two methods can be used:

(1) a microencapsulated colorant having less hydrophilic property is dispersed in water using a dispersant; and (2) a microencapsulated colorant having hydrophilic property is dispersed in water.

The latter method is preferably used in the present invention. This is because by decreasing the content of a dispersant in an ink, a problem in which an ink cannot be properly discharged from nozzles due to release of a dispersant from a pigment and a problem in which viscosity increases due to the dispersant when solvents in the ink evaporate hardly occur.

As the method for preparing microencapsulated colorants, known methods can be used. For example, the following methods can be used but the microencapsulating method is not limited thereto.

(1) A phase-change emulsifying method in which a colorant and a shell material are dissolved or dispersed in an organic phase, and the organic phase is changed to a water phase to prepare an aqueous emulsion;

(2) an In-Situ polymerization method in which a resin in an organic phase is deposited on the surface of a colorant to form a shell of a microcapsule;

(3) an interfacial polymerization method in which resins which are present in both an organic phase and a water phase are reacted at the interface therebetween to form a shell of a microcapsule; and (4) a coacervation method in which the pH, temperature or concentration of an aqueous polymer solution including a colorant is changed to decrease the solubility of the polymer in the solution, resulting in formation of a shell on the surface of the colorant.

After a microcapsule is formed, the organic solvent is removed therefrom to prepare an aqueous dispersion including a microcapsule.

The average particle diameter of such microencapsulated colorants is 0.01 to 1.0 $\mu$m, and preferably from 0.01 to 0.2 $\mu$m. The average particle diameter is measured by the dynamic light scattering method mentioned above.

Suitable resins for use as the shell of microcapsules include polymers in which a hydrophilic monomer and a hydrophobic monomer are copolymerized and salts of the copolymers. As the hydrophilic monomers, anionic monomers such as monomers having a sulfonate group, and monomers having a carboxyl group are typically used.

Specific examples of the monomers having a sulfonate group include styrene sulfonate and its salts, vinyl sulfonate and its salts, etc. Specific examples of the monomers having a carboxyl group include α, β-ethylenic unsaturated carboxylic acids and their derivatives, acrylic acid and its derivatives, methacrylic acid and its derivatives, maleic acid and its derivatives, itaconic acid and its derivatives, fumaric acid and its derivatives, etc.

Specific examples of the hydrophobic monomers include styrene and its derivatives, vinyl toluene and its derivatives, vinyl naphthalene and its derivatives, butadiene and its derivatives, isoprene and its derivatives, ethylene and its derivatives, propylene and its derivatives, isocyanate and its derivatives, alkyl acrylates, alkyl methacrylates, etc.

Specific examples of the of the polymers salts include polymers including an ion such as a hydrogen ion, alkali metal ions, ammonium ions, organic ammonium ions, phosphonium ions, sulfonium ions, oxonium ions, stibonium ions, stannonium ions, an iodide ion, etc. In addition, one or more groups such as polyoxyethylene groups, a hydroxyl group, acrylamide groups, acrylamide derivative groups, a dimethylaminoethyl methacrylate group, an ethoxyethyl methacrylate group, a butoxyethyl methacrylate group, an ethoxytrimethylene methacrylate group, methoxypolyethyleneglycol methacrylate groups, vinyl pyrrolidone groups, vinyl pyridine groups, a vinyl alcohol group, and alkyl ether groups can be added to the polymers and their salts.

Specific examples of the oil soluble dyes for use in the microencapsulated colorants include C.I. Solvent Yellow 1, 2, 3, 13, 19, 22, 29, 36, 37, 38, 39, 40, 43, 44, 45, 47, 62, 63, 71, 76, 81, 85, and 86; C.I. Solvent Red 8, 27, 35, 36, 37, 38, 39, 40, 58, 60, 65, 69, 81, 86, 89, 91, 92, 97, 99, 100, 109, 118, 119 and 122; C.I. Solvent Blue 14, 24, 26, 34, 37, 38, 39, 42, 43, 45, 48, 52, 53, 55, 59 and 67; and C.I. Solvent Black 3, 5, 7, 8, 14, 17, 19, 20, 22, 24, 26, 27, 28, 29, 43 and 45.

Specific examples of the pigments for use in the microencapsulated colorants include carbon blacks and color pigments mentioned above.

The content of the microencapsulated colorant in the ink composition is from 0.1 to 10% by weight, and more preferably from 1.0 to 5.0% by weight. When the content of the colorant is too small, the image density and chromaticness of the resultant images are low. To the contrary, when the content is too high, the brightness of the resultant images deteriorates and the nozzle-choking problem tends to occur.

Specific examples of the marketed products of such process colorants include microencapsulated carbon black, microencapsulated color pigments, which are manufactured by Dainippon Ink and Chemicals, Inc.; microencapsulated carbon black manufactured by Toyo Ink Mfg. Co., Ltd.; particulate resin colorants manufactured by Toyobo Co., Ltd.; emulsion inks using dyes or pigments, manufactured by Kao Corp.; etc.

The ink composition of the present invention may include a dispersant which disperses the pigment included in the ink. Suitable dispersants for use in the ink composition include known dispersants or dispersants which are preferably subjected to alkali-metal reducing treatment mentioned above. It is preferable that the content of alkali metals in the ink is controlled so as to be not greater than about 1000 ppm when a dispersant is added in the ink.

When the ink of the present invention is prepared, it is preferable that a pigment is preliminarily dispersed in a solvent including water using a dispersant and then the dispersion is mixed with other ink constituents.

As the dispersant, polymer dispersants (particularly hydrophilic polymer dispersants) can be preferably used. Specific examples of such hydrophilic polymer dispersants include natural polymers such as vegetable polymers (e.g., acasia, trangacanth gum, goor gum, karaya gum, locust bean gum, arabinogalactone, pectin and quince seed starch), seaweed polymers (e.g., alginic acid, carageenan and agar), animal polymers (e.g., gelatin, casein, albumin, collagen and cellac), and microbe polymers (e.g., xanthene gum and dextran); semi-synthesis polymers such as cellulose polymers (e.g., methyl cellulose, ethyl cellulose, hydroxyethyl cellulose, hydroxypropyl cellulose, and carboxymethyl cellolose), starch polymers (e.g., starch glycolic acid sodium salt, and starch phosphoric acid ester sodium salt), seaweed polymers (e.g., sodium alginate, and propylene glycol esters of alginic acid); synthetic polymers such as polyacrylic acid, polymethacrylic acid, acrylic acid-acrylonitrile copolymers, vinyl acetate-acrylate copolymers, acrylic acid-acrylic acid alkyl ester copolymers, styrene-acrylic acid copolymers, styrene-methacrylic acid copolymers, styrene-acrylic acid-acrylic acid alkyl ester copolymers, styrene-methacrylic acid-acrylic acid alkyl ester copolymers, styrene-α-methylstyrene-acrylic acid copolymers, styrene-α-methylstyrene-acrylic acid-acrylic acid alkyl ester copolymers, styrene-maleic acid copolymers, vinylnaphthalene-maleic acid copolymers, vinyl acetate-ethylene copolymers, vinyl acetate-fatty acid vinyl ester-ethylene copolymers, vinyl acetate-maleic acid ester copolymers, vinyl acetate-crotonic acid copolymers, and vinyl acetate-acrylic acid copolymers; etc.

The weight average molecular weight (Mw) of these copolymers preferably is from 3,000 to 50,000, more preferably from 5,000 to 30,000 and even more preferably from 7,000 to 15,000. The ratio (Mw/Mn) of the weigh average molecular weight (Mw) to the number average molecular weight (Mn) is preferably 0.8 to 1.3 and more preferably from 0.9 to 1.1.

The polymer dispersants are added in the ink alone or in combination in an amount such that the pigment used is stably dispersed and in addition the effects of the present invention are not deteriorated. The ratio (P/D) of the pigment (P) to the dispersant (D) is preferably from 1/0.06 to 1/3, and more preferably from 1/0.125 to 1/3.

Water-soluble surfactants can also be used as the pigment dispersant. By using such water-soluble surfactants, the viscosity of the resultant ink composition can be controlled so as to be relatively low compared to the viscosity of the ink including a polymer dispersant. Therefore an ink composition having good discharging properties can be easily prepared.

Specific examples of water-soluble surfactants for use as the pigment dispersant include anionic surfactants, cationic surfactants, nonionic surfactants and ampholytic surfactants.

Specific examples of the anionic surfactants include alkylaryl sulfonates, alkylphosphates, alkylsulfates, alkylsulfonates, alkylethersulfates, alkylsulfosuccinates, alkylnaphthalenesulfonates, alkylestersulfates, alkylbenzenesulfonates, alkyldiphenyletherdisulfonates, alkylaryltherphosphates, olefinsulfonates, alkaneolefinsulfonates, polyoxyethylenealkyletherphosphates, polyoxyethylenealkylethersulfates, ethercarboxylate, sulfosuccinates, α-sulfofatty acid esters, fatty acid esters, condensation products of a higher fatty acid with an amino acid, naphthenates, etc.

Specific examples of cationic surfactants include alkylamine salts, dialkylamine salts, aliphatic amine salts, benzalkonium salts, quaternary ammonium salts, alkylpyridinium salts, imidazolinium salts, sulfonium salts, onium salts, etc.

Specific examples of nonionic surfactants include polyoxyethylene alkyl ethers, polyoxyethylene alkyl ally esters, polyoxyethylene alkyl phenyl ethers, polyoxyethylene glycol esters, polyoxyethylene fatty acid amides, polyoxyethylene fatty acid esters, polyoxyethylene polyoxypropylene glycol, glycerin esters, sorbitane esters, sucrose esters, polyoxyethylene ethers of a glycerin ester, polyoxyethylene ethers of a sorbitane ester; polyoxyethylene ethers of a sorbitol ester, fatty acid alkanol amides, amineoxides, polyoxyethylene alkyl amines, glycerin fatty acid esters, sorbitane fatty acid esters, polyoxyethylene sorbitane fatty acid esters, polyoxyethylene sorbitol fatty acid esters, alkyl(poly) glycoxide, etc.

Specific examples of the ampholytic surfactants include imidazoline derivatives such as imidazolinium betaine; dimethylalkyllauryl betaine, alkyl glycin, alkyldi(aminoethyl) glycin, etc.

The surfactants serving as a dispersant are added in the ink alone or in combination in an amount such that the pigment used is stably dispersed and in addition the effects of the present invention are not deteriorated.

The content of the surfactant in the ink composition of the present invention is 0.01 to 5.0% by weight, and preferably from 0.5 to 3% by weight. When the content is too low, the effect cannot be exerted. When the content is too large, the penetration property is seriously heightened, resulting in decrease of image density and occurrence of ink-penetration problem in which the ink penetrates the recording material and reaches the backside thereof.

The ink composition of the present invention may include known additives other than the colorants, dispersants, and solvents mentioned above such as antiseptic/antimildew agents, pH controlling agents, chelating agents, antirust agents, ultraviolet absorbing agents, infrared absorbing agents, water-soluble polymers, colorant dissolving agents, etc. Additives are added to the ink after the above-mentioned alkali metal removing treatment or without the treatment. The content of alkali metals in the ink is controlled so as to be not greater than about 1000 ppm after additives are added.

Specific examples of the antiseptic/antimildew agents include sodium benzoate, sodium pentachlorophnol, sodium 2-pyridinethhiol-oxide, sodium sorbate, sodium dehydroacetate, etc. It is more preferable to use 1,2-dibenzylisothiazoline-3-one (PROXEL CRL, PROXEL LV, PROXEL BDN, and PROXEL GXL, all of which are manufactured by Avecia; and SUNPACK AP manufactured by San-Ai Oil Co., Ltd.), to reduce the alkali metal content of the ink composition.

A pH controlling agent can be added to the ink of the present invention. Any known pH controlling agents can be used if the agents can control the pH of the ink without adversely affecting the properties of the ink composition. Specific examples of the pH controlling agents include alkali metal hydroxides such as lithium hydroxide, sodium hydroxide and potassium hydroxide; alkali metal carbonates such as lithium carbonate, sodium carbonate and potassium carbonate; amines such as diethanol amine and triethanol amine; hydroxides such as ammonium hydroxide, quaternary ammonium hydroxides and quaternary onium hydroxides; etc. Among these compounds, amines such as diethanol amine and triethanol amine; and hydroxides such as ammonium hydroxide, quaternary ammonium hydroxides and quaternary onium hydroxides are preferably used to control the alkali metal content of the resultant ink composition in the desired range.

Next, the inkjet recording apparatus of the present invention having a recording unit including a recording ink container configured to contain a recording ink and a recording head configured to discharge the recording ink will be explained referring to the attached drawings. However, the present invention is not limited thereto.

FIG. 1 is a schematic view illustrating the working part of an embodiment of the inkjet recording apparatus of the present invention, which is a serial inkjet recording apparatus and has an ink cartridge having an ink container containing the ink composition of the present invention.

In the inkjet recording apparatus as shown in FIG. 1, a main support/guide rod 3 (hereinafter a main guide rod 3) and a trailing support/guide rod 4 (hereinafter a trailing guide rod 4) are supported by side plates 1 and 2 such that the main guide rod 3 and trailing guide rod 4 are set substantially horizontally (i.e., in a direction indicated by a double-head arrow). A carriage unit 5 slides in a main scanning direction while being supported by the main guide rod 3 and trailing guide rod 4. The carriage unit 5 has four heads 6, i.e., a yellow ink head 6y, a magenta ink head 6m, a cyan ink head 6c and a black ink head 6k, each of which discharges a yellow ink, a magenta ink, a cyan ink and a black ink, respectively. An ink discharging surface 6a (i.e., a surface having nozzles) faces downward. In the upper part of the carriage unit 5, four ink cartridges 7y, 7m, 7c and 7k which respectively supply the yellow, magenta, cyan or black inks to the respective head 6y, 6m, 6c or 6k, are exchangeably set.

The carriage unit 5 is connected with a timing belt 11 which is rotated by a drive pulley 9 (i.e., a drive timing pulley), which is driven by a main scanning motor 8, and a driven pulley 10 (i.e., an idle pulley) while stretched. By driving the main scanning motor 8 while controlling, the carriage 5 (i.e., four recording heads 6) slides in the main scanning direction.

Sub-flames 13 and 14 stand on a bottom plate 12 connected with the side plates 1 and 2. The sub-flames 13 and 14 rotatably support a feeding roller 15 which feeds a recording material 16 in a sub-scanning direction perpendicular to the main scanning direction. A sub-scanning motor 17 is arranged outside of the sub-flame 14. A gear 18 which is fixed on a rotation axis of the sub-scanning motor 17 engages a gear 19 fixed on an axis of the feeding roller 15 to transmit the rotation of the sub-scanning motor 17 to the feeding roller 15.

At a location between the side plate 1 and sub-flame 13, a reliability maintaining mechanism 21 (hereinafter referred to as a sub-system 21) configured to maintain the reliability of the head 6 is provided. The sub-system 21 has four caps 22 which cap the four ink discharging surfaces 6a and which are supported by a holder 23. The holder 23 is slidably supported by a link member 24. When the carriage unit 5 moving toward the side plate 1 contacts a plate 25 engaging the holder 23, the holder 23 is lifted up due to the movement of the carriage unit 5, and thereby the discharging surfaces 6a of the inkjet head 6 are capped with the caps 22. When the carriage unit 5 located on the caps 22 moves toward the side plate 2, the holder 23 is lowered due to the movement of the carriage unit 5, resulting in separation of the discharge surfaces 6a of the inkjet head 6 from the caps 22.

The caps 22 are connected with a suction pump 27 via a suction tube 26. In addition, the caps 22 have air openings which lead to air through a tube and a valve. In addition, the ink (waste ink) collected by the suction pump 27 is discharged to a waste ink tank (not shown) via a drain tube.

At a location outside the holder 23, a wiper blade 28 configured to wipe the discharging surfaces 6a of the inkjet head 6 and made of a material such as textile, foamed materials, and elastic materials (e.g., rubbers) is provided on a blade arm 29. The blade arm 29 is supported so as to be oscillated by a cam rotated by a driving device (not shown).

Figure 2:
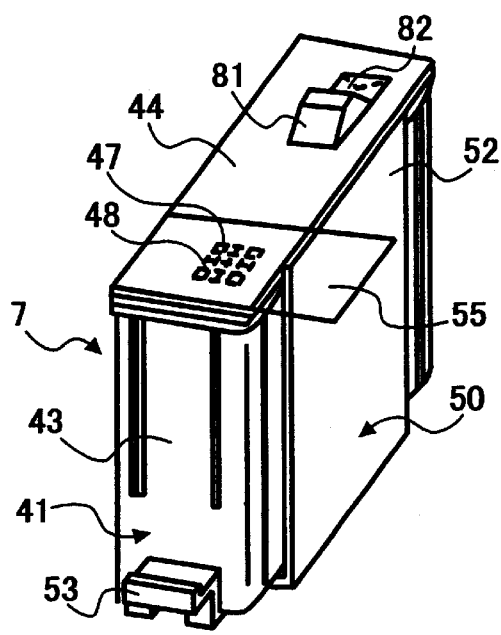
FIG. 2 is a perspective view of an embodiment of the ink cartridge of the present invention.

Next, the ink cartridge will be explained referring to FIGS. 2 and 3. FIG. 2 is a perspective view illustrating an ink cartridge 7 before the ink cartridge 7 is set in the ink jet recording apparatus, and FIG. 3 is a sectional front elevation of the ink cartridge 7 as shown in FIG. 2.

Figure 3:
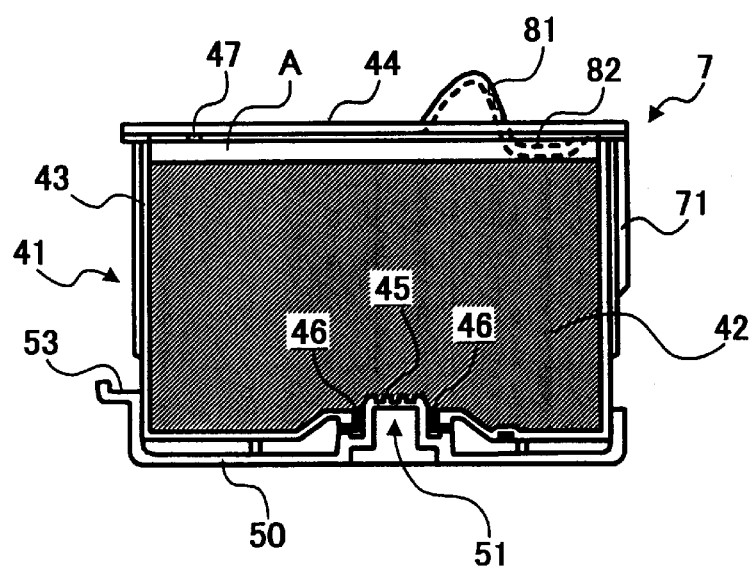
FIG. 3 is a cross section of the ink cartridge illustrated in FIG. 2.

As shown in FIG. 3, the ink cartridge 7 has a cartridge main body 41 in which an ink absorber 42 is contained. The ink absorber 42 absorbs a color ink (for example, a yellow, a magenta, a cyan or a black ink). The ink is the ink composition of the present invention. The cartridge main body 41 has a container 43 having a large opening on an upper part thereof and a top cover 44 which is adhered on the container 43 using an adhesive or by welding. The main body is made of, for example, a resin (a mold of resin). The ink absorber 42 is formed of a porous material such as urethane foams. Such a porous material is contained in the cartridge main body 41 upon application of pressure and then an ink is injected into the porous material such that the porous material absorbs the ink.

At the bottom of the cartridge main body 41, an ink supplying opening 45 is provided to supply the ink to one of the recording heads 6. A seal ring 46 is engaged with the inside periphery of the ink supplying opening 45. In addition, the upper cover 44 has an air opening 47.

The cartridge main body 41 has a cap 50. The cap 50 covers the ink supplying opening 45 to prevent the ink contained therein from leaking from the main body 41 before the cartridge is set in an inkjet recording apparatus. In addition, the cap 50 prevents the ink from leaking from the main body 41 due to deformation of the case 43 caused by the pressure applied to the wide surface of the cartridge when the cartridge is set, handled or wrapped in vacuum.

A film seal 55 having an oxygen permeability not less than 100 ml/m$^2$ is adhered on the air opening 47 to seal the air opening 47 as shown in FIG. 2. The film seal 55 seals not only the air opening 47 but also plural grooves 48 formed in the vicinity of the air opening 55. By sealing the air opening 47 with a film seal 55 having an oxygen permeability not less than 100 ml/m$^2$, the ink can be effectively deaerated when the cartridge 7 is wrapped under a reduced pressure even when air is dissolved in the ink when the ink is filled in the cartridge or air present in a space A (as shown in FIG. 3) formed between the ink absorber 42 and the cartridge main body 41 is dissolved in the ink. Namely, when such a sealed ink cartridge is wrapped with a packaging material which hardly transmit air, such as films laminated with aluminum, under a reduced pressure, the air dissolved in the ink can be discharged to the space formed between the cartridge main body 41 and the wrapping material.

Numeral 51 denotes a projection of the cap 50, which is formed to prevent the ink from leaking from the main body 41 of the ink cartridge. Numeral 53 denote a projection, and by pressing the projection 53, the cap 50 can be easily disengaged from the main body 41. Numeral 71 denotes a projection by which the color of the ink in the cartridge can be determined. Numerals 81 and 82 denote a projection and a recess by which the cartridge can be easily disengaged from the printer.

Figure 4:
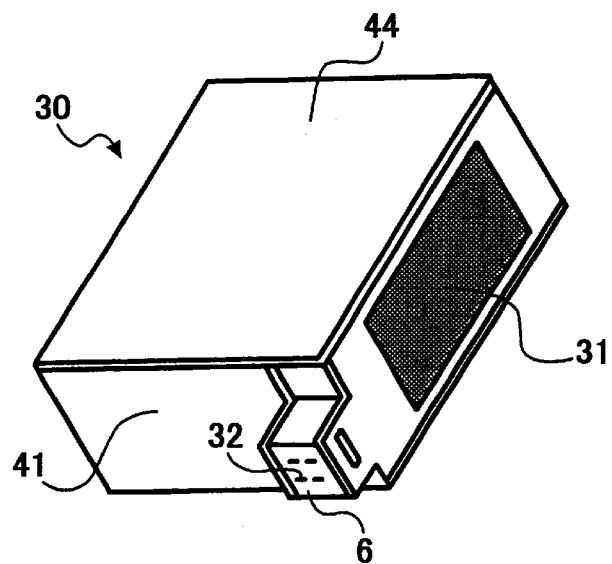
FIG. 4 is a perspective view of an embodiment of the ink cartridge, which is integrated with a recording head, for use in the inkjet recording apparatus of the present invention.

FIG. 4 is a schematic view illustrating the recording unit having an ink container containing the recording ink of the present invention and a recording head discharging drops of the ink. Then the recording unit will be explained referring to FIG. 4.

A recording unit 30 is used for serial inkjet printers. The recording unit 30 includes, as main elements, a recording head 6, an ink tank 41 containing the recording ink to be supplied to the recording head 6, and a container cover 44 keeping the ink tank 41 airtight. The recording head 6 has plural nozzles 32 to discharge the recording ink. The recording ink is supplied from the ink tank 41 to an ink room (not shown) through an ink supplying tube (not shown). The recording ink in the ink room is discharged from the nozzles 32 according to electric signals input from the main body of the inkjet recording apparatus through an electrode 31. The recording unit of this type is typically used for so-called thermal- or bubble-inkjet recording heads which can be manufactured at a low cost and which utilizes heat energy as the power source for discharging ink drops.

Figure 5:
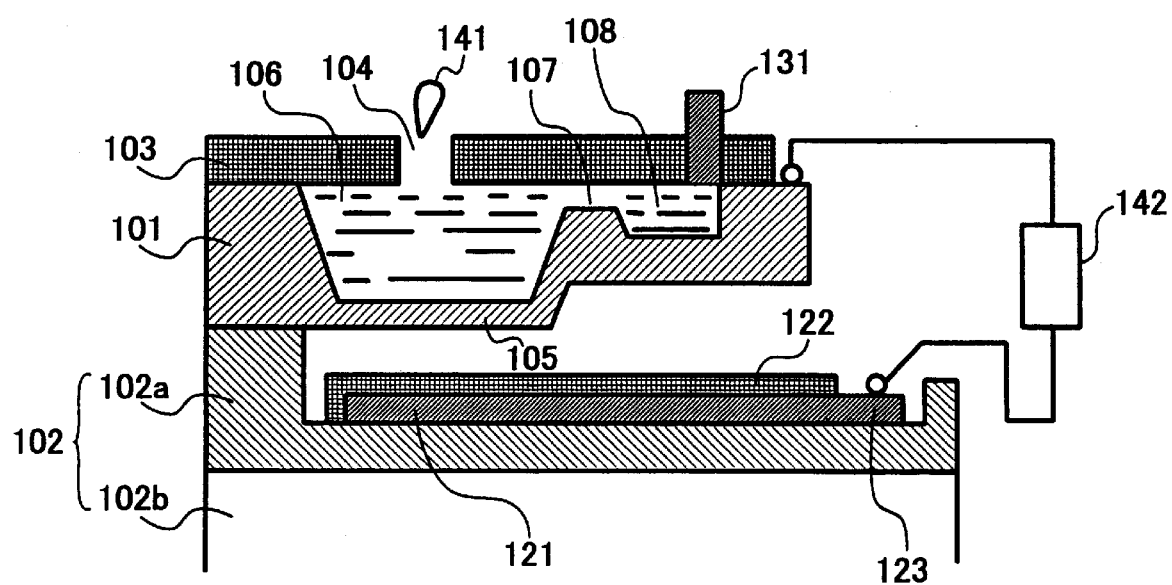
FIG. 5 is a cross section of a recording head for use in the inkjet recording apparatus of the present invention.

The recording head discharging ink drops will be explained referring to FIG. 5. FIG. 5 is a cross sectional side view of an electrostatic inkjet recording head.

The recording head as shown FIG. 5 includes three single-crystal silicon substrates 101, 102 (i.e., 102a and 102b) and 103 which are overlaid while being adhered. The reason why single crystal silicon is used for the recording head is that a thin vibrating plate which has a thickness of about few micrometers and which is used for discharging ink can be easily prepared by an etching method. In addition, the material is advantageous because of being easily connected with a high degree of accuracy using an anode junction method.

In addition, when the vibrating plate is vibrated upon application of electrostatic force, it is needed to apply a voltage to an electrode to generate the electrostatic force. Since silicon is a semiconductor and can be easily processed so as to have a low resistance, the silicon substrate can serve as an electrode of the vibrating plate. Namely, silicon is advantageously used because an additional electrode need not to be formed on the vibrating plate side.

The intermediate substrate, i.e., the first substrate 101, has a first recessed portion forming an ink room 106 and having a bottom wall serving as a vibrating plate 105, a projection which is formed at the rear of the recessed portion and which forms an ink-flow-regulating portion 107 and a second recessed portion which forms an ink cavity 108 which commonly supplies the ink to the plural ink rooms 106.

The second substrate 102 which is adhered with the lower surface of the first substrate 101 is constituted of a single-crystal silicon substrate 102b and a silicon oxide layer 102a formed on the silicon substrate 102b. On the silicon oxide layer 102a, an electrode 121 which has a form similar to that of the vibrating plate 105 is formed. The electrode 121 has an electrode terminal portion 123. The electrode 121 is covered with an insulating layer 122 except for the terminal portion 123. The second substrate 102 can also be made of PYREX glass, etc.

The third substrate 103 which is adhered with the upper surface of the first substrate 101 has a nozzle 104. The third substrate 103 and first substrate 101 form the ink room 106, the ink-flow-regulating portion 107 and the ink cavity 108. The third substrate 103 also has an ink supplying opening 131 through which the ink is supplied to the ink cavity 108. The ink supplying opening 131 is connected with the ink cartridge (not shown) through a connecting pipe and a tube (not shown). The third substrate 103 can also be made of a material such as glass, nickel, plastics, stainless steel, etc.

When a positive pulse voltage is applied to the electrode 121 by an oscillating circuit 142 in the thus constructed inkjet recording head utilizing an electrostatic force, the surface of the electrode 121 is charged so as to have a positive potential and the vibrating plate facing the electrode 121 is charged so as to have a negative potential, and thereby the vibrating plate 105 bends downward due to electrostatic attraction force.

When application of the pulse voltage to the electrode 121 is stopped, the bent vibrating plate 105 is returned to the former position, resulting in rapid increase of the pressure in the ink room 106, and thereby an ink drop 141 is discharged from the nozzle 104 toward a receiving material (not shown). Then the vibrating plate 105 is again bent downward, and thereby the ink in the ink cavity 108 is supplied to the ink room 106 through the ink-flow-regulating portion 107. As the oscillating circuit 142, the above-mentioned circuits which put on/off a pulse voltage or alternators can be used. When images are formed, electric pulses are applied to the electrode 121 while being controlled according to image signals to discharge ink drops from the nozzles 104.

The ink composition of the present invention hardly dissolves the first, second and third substrates of the printer which are made of silicon, silicon oxide, glass or the like material. Therefore, problems such that image qualities and ink discharging property are deteriorated due to deformation of the ink room, ink-flow-regulating portion and ink cavity, and the recording head is damaged due to deterioration of adhesion strength of the junctions of the substrates can be prevented. In addition, the nozzle-choking problem caused by dissolution of the material such as silicon, silicon oxide and/or glass into the ink can also be prevented.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Synthesis Method of Sulfonium Salt

After the inside atmosphere of a one-liter four-neck flask having a stirrer, a reflux condenser, and a thermometer was substituted with nitrogen, 12.4 g (i.e., 0.2 moles) of dimethylsulfide (first compound) and 200 ml of acetonitrile were contained therein. The mixture was mixed while stirred and then 22.5 g (i.e., 0.2 moles) of chlorobenzene (second compound), which were dissolved in 100 ml of acetonitrile were dropped into the mixture for 1 hour while stirred, heated and refluxed to perform the reaction mentioned below. In addition, when the mixture was further heated for 5 hours while stirred and refluxed to continue the reaction, a white crystal was precipitated.

Then the mixture was cooled to room temperature, and the precipitated crystal was separated by filtering and then dried. Thus, 30.2 g of phenyldimethylsulfoniumchloride were obtained. The yield was 86.7%. The reaction is expressed by the reaction formula described below.

Then 8.7 g (0.05 moles) of the thus prepared phenyldimethylsulfoniumchloride were dissolved in 200 ml of a mixture of methanol and water (mixing ratio of 1/1 by volume) in a one-liter flask. When 2 g (i.e., 0.05 moles) of sodium hydroxide dissolved in 300 ml of water were dropped into the mixture while stirring, a precipitate was formed and a white slurry was formed). This reaction is also expressed by the reaction formula described below.

After completion of the dropping operation, the mixture was stirred at room temperature for 1 hour and then the crystal was separated by filtering. When the crystal was recrystallized using methanol, 6.5 g of phenyldimethylsulfoniumhydroxide were obtained. The yield was 83.0%.

This phenyldimethylsulfoniumhydroxide was subjected to an elemental analysis. The result is shown in Table 1.

Reaction Formula

TABLE 1

| | C (%) | H (%) | S (%) |
|---|---|---|---|
| Found value | 61.54 | 7.69 | 20.51 |
| Calculated value | 62.29 | 7.64 | 20.47 |

Compounds Nos. 27 to 50 as shown in Table 2 were prepared by the same synthesis method as performed above were prepared.

When a compound in a gas state was reacted, the reaction was performed after the compound was cooled by liquid nitrogen to be liquefied or the reaction was performed in an autoclave upon application of pressure.

TABLE 2

| No. | First compound | Second compound |
|---|---|---|
| 27 | Diethylsulfide | chloroethane (i.e., ethyl chloride) |
| 28 | Dipropylsulfide | 1-chloropropane (i.e., propyl chloride) |
| 29 | Dibutylsulfide | 1-chlorobutane (i.e., butyl chloride) |
| 30 | β-thiodiglycol | 2-chloroethanol |
| 31 | Dimethylsulfide | chloromethane (i.e., methyl chloride) |
| 32 | Dimethylsulfide | chloroethane |
| 33 | Diethylsulfide | chloromethane |
| 34 | Dimethylsulfide | 1-chloropropane |
| 35 | Dimethylsulfide | 1-chlorobutane |
| 36 | Dipropylsulfide | chloroethane |
| 37 | Dimethylsulfide | 1-chloropentane (i.e., pentyl chloride) |
| 38 | Dibutylsulfide | chloromethane |
| 39 | β-thiodiglycol | chloromethane |
| 40 | Dimethylsulfide | 2-chloroethanol |
| 41 | Diethylsulfide | chloromethanol |
| 42 | β-thiodiglycol | chloroethane |
| 43 | β-thiodiglycol | 1-chloropropane |
| 44 | Dimethylsulfide | 2-chloroethanol |
| 45 | Diethylsulfide | 4-chlorobutanol |
| 46 | Dimethylsulfide | 4-chlorobutanol |
| 47 | Dimethylsulfide | 4-chlorobutanol |
| 48 | 2,2-thiodichloroethane | Chloromethane |
| 49 | Dimethylsulfide | Dichloroethane |
| 50 | Dimethylsulfide | Chlorobenzene |

EXAMPLE 1

The following components were mixed and the mixture was heated at 50° C. for 4 hours while stirring.

| | |
|---|---:|
| Black dye having the following formula: | 3% |
| HOOC-[structure with N=N, NH, NH₂, HO₃S, SO₃H groups] | |
| Glycerin | 5% |
| Ethylene glycol | 20% |
| Sodium polyoxyethylene (3) tridecylether acetate (anionic surfactant, manufactured by Nikko Chemicals Co., Ltd.) | 1.0% |
| Antimildew agent (SUNPACK AP, manufactured by San-Ai Oil Co., Ltd.) | 0.4% |
| Tetrabutylphosphoniumhydroxide (ALDRICH reagent serving as a corrosion inhibitor) | 1.0% |
| Deionized water | 69.6% |

The mixture was cooled and then subjected to filtration using a filter having openings of 0.1 $\mu$m in diameter.

When this ink was subjected to plasma emission spectrometry, the content of alkali metals in the ink was 814 ppm. In addition, the pH of the ink was 9.5.

This ink was evaluated with respect to image qualities and reliability. The image recording conditions are as follows:
Printer
  Inkjetting method:
    a method in which an ink drop is discharged from a nozzle utilizing vibration of a plate which is due to electrostatic force
  Vibrating plate:
    silicon oxide layer of 1000 Å thick formed on a 110 surface of silicon by a heat-oxidization treatment
  Material constituting ink room:
    PYREX glass #7740 and silicon having surfaces of 100, 110 and 111
  Material constituting nozzles and liquid-resistance portion:
    silicon having surfaces of 100 and 111
Recording Conditions
  Driving frequency: 12 KHz
  Driving voltage: 23 V
  Diameter of nozzle: 30 $\mu$m
  Volume of a discharged ink drop: 30 pl/dot
  Number of nozzle: 48 nozzles
  Dot density of recorded images: 600 dpi
Test 1 (T1) (Initial Image Recording Test)
  Images are recorded on three kinds of marketed copy papers and marketed three kinds of bond papers, and the image qualities are evaluated.
Test 2 (T2) (Reliability Test, i.e., 1-Month-Interval Image Recording Test to Evaluate Liquid Contact Property of the Ink)
  Images are recorded after the printer in which the ink had been loaded was set in a location at 50°C. 60% RH for 1 month. The images were observed to determine whether the images were normally recorded. In addition, changes of thickness of the members made of glass and silicon and thickness of the silicon oxide layer were determined by measuring the content of silicon in the ink which was measured by plasma emission spectrometry. The changes of thickness of the recording members were determined using the silicon content of the ink and the density of the element (Si, etc.).

As a result of the initial image recording test, clear images having an image density not lower than 1.3 could be obtained.

As a result of the reliability test, good images can be recorded without using recovering means. With respect to the liquid contact property of the ink, the thickness change of the PYREX glass was 0.18 $\mu$m and the thickness changes of the 100 surface, 110 surface and 111 surface of silicon were about 0.16 $\mu$m, about 0.06 $\mu$m and about 0.04 $\mu$m, respectively. Such thickness changes of the ink room, ink-flow-regulating portion and nozzles caused no problem for the printer. In addition, the thickness change of the silicon oxide layer was about 3 Å, and such a thickness change of the vibrating plate caused no problem for the printer.

EXAMPLE 2

The procedures for preparation and evaluation of the ink in Example 1 were repeated except that tetrabutylphosphoniumhydroxide was replaced with tributylsulfoniumhydroxide (Compound No. 29 which serves as a corrosion inhibitor).

As a result of the initial test, clear images having an image density not lower than 1.3 could be obtained.

As a result of the reliability test, good images can be recorded without using recovering means. With respect to the liquid contact property of the ink, the thickness change of the PYREX glass was 0.18 $\mu$m and the thickness changes of the 100 surface, 110 surface and 111 surface of silicon were about 0.16 $\mu$m, about 0.06 $\mu$m and about 0.04 $\mu$m, respectively. Such thickness changes of the ink room, ink-flow-regulating portion and nozzles caused no problem for the printer. In addition, the thickness change of the silicon oxide layer was about 3 Å, and such a thickness change of the vibrating plate caused no problem for the printer.

EXAMPLE 3

The following components were mixed and the mixture was heated at 50° C. for 4 hours while stirring.

| | |
|---|---:|
| Cyan dye having the following formula: [Cu phthalocyanine structure with $-(SO_2NH_2)_{2-3}$ and $-(SO_3H)_{1-2}$ substituents] | 3% |
| Glycerin | 10% |
| Diethylene glycol | 10% |
| An adduct of acetylene alcohol with ethylene oxide (SURFINOL 465, nonionic surfactant, manufactured by Air Products and Chemicals Inc.) | 1.0% |
| Diethyleneglycol monobutyl ether | 3% |
| Antimildew agent (PROXEL CRL, manufactured by Abysia Co. Ltd.) | 0.4% |

| | |
|---|---|
| Tetrabutylphosphoniumhydroxide (ALDRICH reagent serving as a corrosion inhibitor) | 0.5% |
| Deionized water | 72.1% |

The mixture was cooled and then subjected to filtration using a filter having openings of 0.1 μm in diameter.

When this ink was subjected to the plasma emission spectrometry analysis, the content of alkali metals in the ink was 913 ppm. In addition, the pH of the ink was 9.2.

This ink was subjected to the image recording test and reliability test using a printer having a recording head having the structure as shown in FIG. 5. The recording head was prepared as follows.

The first substrate 101 was made of a p-form single-crystal silicon wafer having a 110 plane direction, both sides of which were polished, and the second substrate 102 included a p-form single-crystal silicon wafer 102b having a 100 plane direction, both sides of which were polished and a thermally-oxidized silicon oxide layer 102a. These substrates were treated to anisotropic etching treatment using a mask and an alkali liquid to prepare the ink room 106, ink-flow-regulation portion 107, ink cavity 108, etc. In addition, the electrode 121, electrode leading element, electrode terminal 123 and insulating layer 122 were formed. The thickness of the vibrating plate 105 was 20 μm and a silicon oxide layer having a thickness of 1000 Å was formed thereon by a heat oxidation treatment.

Further, a third substrate 103 in which nozzles 104, and ink supplying opening 131 were formed on a n-form single-crystal silicon wafer by anisotropic dry etching was adhered with the first substrate 101 as shown in FIG. 5. As shown in FIG. 5, an oscillating circuit was connected with the electrode terminal 123 to apply a positive voltage to the terminal 123. Thus images were recorded.

Therefore, the ink contacted the silicon oxide layer having a thickness of 1000 Å formed on the (110)-silicon-surface of the vibrating plate, the silicon-surfaces of the ink room having plane directions (100), (110) and (111), the anisotropically-dry-etched silicon surface of the nozzles having a plane direction (100), and the silicon surface of the ink-flow-regulating portion having plane directions (100) and The ink was evaluated in the same way as performed in Example 1.

As a result of the initial test, clear images having an image density not lower than 1.3 could be obtained.

As a result of the reliability test, good images can be recorded without using recovering means. With respect to the liquid contact property of the ink, the thickness change of the 100, 110 and 111 surfaces of silicon were about 0.15 μm, about 0.06 μm and about 0.04 μm, respectively. Such thickness changes of the ink room, ink-flow-regulating portion and nozzles caused no problem for the printer. In addition, the thickness change of the silicon oxide layer was about 3 Å, and such a thickness change of the vibrating plate caused no problem for the printer.

EXAMPLE 4

The procedures for preparation and evaluation of the ink in Example 3 were repeated except that tetrabutylphosphoniumhydroxide was replaced with teterbutylarsoniumhydroxide (compound No. 74 serving as a corrosion inhibitor).

As a result of the initial test, clear images having an image density not lower than 1.3 could be obtained.

As a result of the reliability test, good images can be recorded without using recovering means. With respect to the liquid contact property of the ink, the thickness change of the 100, 110 and 111 surfaces of silicon were about 0.15 μm, about 0.06 μm and about 0.04 μm, respectively. Such thickness changes of the ink room, ink-flow-regulating portion and nozzles caused no problem for the printer. In addition, the thickness change of the silicon oxide layer was about 3 Å, and such a thickness change of the vibrating plate caused no problem for the printer.

EXAMPLE 5

The following components were mixed and the mixture was heated at 50° C. while stirring.

| | |
|---|---|
| Yellow dye having the following formula: 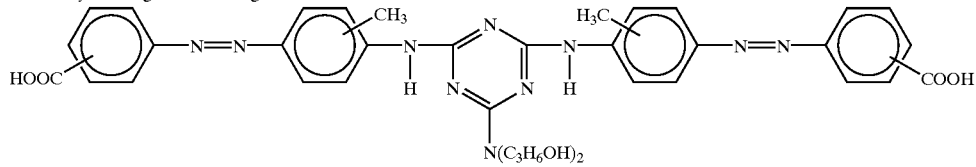 | 2% |
| Glycerin | 3% |
| Triethylene glycol | 10% |
| Anion surfactant having the following formula of dialkylsulfosuccinate: 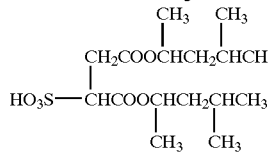 | 1.0% |
| 2-ethyl-1,3-hexanediol | 2% |
| Antimildew agent (PROXEL BND, manufactured by Abysia Co., Ltd.) | 0.4% |
| Deionized water | 81.6% |

A phosphonium hydroxide compound No. 1 and a hydroxide another phosphonium hydroxide compound No. 3, which are described above, were added to the mixture in an amount of 40% weight per equivalent of the anionic compounds in the mixture, respectively while stirring.

The mixture was agitated for 4 hours and then cooled. The mixture was then subjected to filtration using a filter having openings of 0.1 μm in diameter.

When this ink was subjected to the plasma emission spectrometry analysis, the content of alkali metals in the ink was 29 ppm. In addition, the pH of the ink was 9.7.

The procedure for evaluation of the ink in Example 1 was repeated except that the PYREX glass #47740 of the ink room was replaced with a non-alkali glass (OA-2 manufactured by Nippon Electric Glass Co., Ltd.).

As a result of the initial image recording test, clear images having an image density not lower than 0.9 could be obtained on each recording paper.

As a result of the reliability test, good images can be recorded without using recovering means. With respect to the liquid contact property of the ink, the thickness change of the non-alkali glass was 0.19 μm and the thickness changes of the 100 surface, 110 surface and 111 surface of silicon were about 0.15 μm, about 0.07 μm and about 0.05 μm, respectively. Such thickness changes of the ink room, ink-flow-regulating portion and nozzles caused no problem for the printer. In addition, the thickness change of the silicon oxide layer was about 3 Å, and such a thickness change of the vibrating plate caused no problem for the printer.

EXAMPLE 6

The procedures for preparation and evaluation of the ink in Example 5 were repeated except that the phosphonium hydroxide compounds Nos. 1 and 3 were replaced with sulfonium hydroxide compounds Nos. 27 and 29.

As a result of the initial image recording test, clear images having an image density not lower than 0.9 could be obtained on each recording paper.

As a result of the reliability test, good images can be recorded without using recovering means. With respect to the liquid contact property of the ink, the thickness change of the non-alkali glass was 0.19 μm and the thickness changes of the 100 surface, 110 surface and 111 surface of silicon were about 0.15 μm, about 0.07 μm and about 0.05 μm, respectively. Such thickness changes of the ink room, ink-flow-regulating portion and nozzles caused no problem for the printer. In addition, the thickness change of the silicon oxide layer was about 3 Å, and such a thickness change of the vibrating plate caused no problem for the printer.

EXAMPLE 7

The following components were mixed and the mixture was heated at 50° C. for 4 hours while agitating.

| | |
|---|---|
| Magenta dye having the following formula: | 2.5% |
| Diethylene glycol | 20% |
| Sodium polyoxyethylene (6) tridecylether acetate (anionic surfactant, manufactured by Nikko Chemicals Co., Ltd.) | 0.3% |
| 2-pyrrolidone | 2% |
| Antimildew agent (PROXEL GXL, manufactured by Abysia Co., Ltd.) | 0.4% |
| 3,5-dimethyl-1-hexine-3-ol (SURFINOL 61, a corrosion inhibitor, manufactured by Nisshin Chemical Industry Co., Ltd.) | 0.9% |
| Deionized water | 73.9% |

The mixture was cooled and then subjected to filtration using a filter having openings of 0.1 μm in diameter.

When this ink was subjected to the plasma emission spectrometry analysis, the content of alkali metals in the ink was 460 ppm. In addition, the pH of the ink was 10.1.

The procedure for evaluation of the ink in Example 3 was repeated.

As a result of the initial test, clear images having an image density not lower than 1.1 could be obtained on each recording paper.

As a result of the reliability test, good images can be recorded without using recovering means. With respect to the liquid contact property of the ink, the thickness change of the 100, 110 and 111 surfaces of silicon were about 0.32 μm, about 0.10 μm and about 0.08 μm, respectively. Such thickness changes of the ink room, ink-flow-regulating portion and nozzles caused no problem for the printer. In addition, the thickness change of the silicon oxide layer was about 5 Å, and such a thickness change of the vibrating plate caused no problem for the printer.

EXAMPLE 8

The procedures for preparation and evaluation of the ink in Example 7 were repeated except that SURFINOL 61 was replaced with beryllium hydroxide serving as a corrosion inhibitor.

As a result of the initial test, clear images having an image density not lower than 1.1 could be obtained on each recording paper.

As a result of the reliability test, good images can be recorded without using recovering means. With respect to the liquid contact property of the ink, the thickness change of the 100, 110 and 111 surfaces of silicon were about 0.32 μm, about 0.10 μm and about 0.08 μm, respectively. Such thickness changes of the ink room, ink-flow-regulating portion and nozzles caused no problem for the printer. In addition, the thickness change of the silicon oxide layer was about 5 Å, and such a thickness change of the vibrating plate caused no problem for the printer.

EXAMPLE 9

The following components were mixed and the mixture was heated at 50° C. for 4 hours while agitating.

| | |
|---|---|
| Carbon black with which a carboxyl group is grafted (average particle diameter of 128 nm) | 5% |
| Glycerin | 10% |
| Diethylene glycol | 10% |
| Sodium polyoxyethylene (3) tridecylether acetate (anionic surfactant, manufactured by Nikko Chemicals Co., Ltd.) | 1.0% |
| 2-pyrrolidone | 2% |
| 2-ethyl-1,3-hexanediol | 2% |
| Antimildew agent (SUNPACK AP, manufactured by San-Ai Oil Co., Ltd.) | 0.4% |
| 3-methyl-1-butine-3-ol (OLFIN B, a corrosion inhibitor, manufactured by Nisshin Chemical Industry Co., Ltd.) | 0.5% |
| Deionized water | 69.1% |

The mixture was cooled and then subjected to filtration using a filter having openings of 0.8 μm in diameter.

When this ink was subjected to the plasma emission spectrometry analysis, the content of alkali metals in the ink was 1020 ppm. In addition, the pH of the ink was 8.3.

The procedure for evaluation of the ink in Example 3 was repeated.

As a result of the initial test, clear images having an image density not lower than 1.4 could be obtained on each recording paper.

As a result of the reliability test, good images can be recorded without using recovering means. With respect to the liquid contact property of the ink, the thickness change of the 100, 110 and 111 surfaces of silicon were about 0.20 μm, about 0.07 μm and about 0.04 μm, respectively. Such thickness changes of the ink room, ink-flow-regulating portion and nozzles caused no problem for the printer. In addition, the thickness change of the silicon oxide layer was about 3 Å, and such a thickness change of the vibrating plate caused no problem for the printer.

EXAMPLE 10

The procedures for preparation and evaluation of the ink in Example 9 were repeated except that OLFIN B was replaced with aluminum ethylate serving as a corrosion inhibitor.

As a result of the initial test, clear images having an image density not lower than 1.4 could be obtained on each recording paper.

As a result of the reliability test, good images can be recorded without using recovering means. With respect to the liquid contact property of the ink, the thickness change of the 100, 110 and 111 surfaces of silicon were about 0.20 μm, about 0.07 μm and about 0.04 μm, respectively. Such thickness changes of the ink room, ink-flow-regulating portion and nozzles caused no problem for the printer. In addition, the thickness change of the silicon oxide layer was about 3 Å, and such a thickness change of the vibrating plate caused no problem for the printer.

EXAMPLE 11

The procedures for preparation and evaluation of the ink in Example 1 were repeated except that PYREX glass was replaced with a non-alkali glass (OA-10 manufactured by Nippon Electric Glass Co., Ltd.); the filter was replaced with a filter having openings of 0.8 μm in diameter; and the formulation of the ink was changed as follows:

| | |
|---|---|
| Cationic carbon black dispersion | 5% |
| Glycerin | 5% |
| Ethylene glycol | 20% |
| OLFIN E1010 (manufactured by Nisshin Chemical Industry Co., Ltd.) | 1.0% |
| Antimildew agent (SUNPACK AP, manufactured by San-Ai Oil Co., Ltd.) | 0.4% |
| Deionized water | 68.6% |

When this ink was subjected to the plasma emission spectrometry analysis, the content of alkali metals in the ink was 932 ppm. In addition, the pH of the ink was 9.8.

As a result of the initial image recording test, clear images having an image density not lower than 1.2 could be obtained on each recording paper.

As a result of the reliability test, good images can be recorded without using recovering means. With respect to the liquid contact property of the ink, the thickness change of the non-alkali glass was 0.31 μm and the thickness changes of the 100 surface, 110 surface and 111 surface of silicon were about 0.18 μm, about 0.08 μm and about 0.05 μm, respectively. Such thickness changes of the ink room, ink-flow-regulating portion and nozzles caused no problem for the printer. In addition, the thickness change of the silicon oxide layer was about 4 Å, and such a thickness change of the vibrating plate caused no problem for the printer.

EXAMPLE 12

The procedures for preparation and evaluation of the ink in Example 1 were repeated except that the black dye was replaced with the following cyan pigment dispersion in an amount of 15%; the corrosion inhibitor was replaced with the following corrosion inhibitor; the content of water was changed to 58.5%; and the filter was replaced with a filer having openings of 0.8 μm in diameter.

| | |
|---|---|
| Cyan pigment dispersion | |
| C.I. Pigment Blue 15:3 (phthalocyanine blue) (average particle diameter of 123 nm) | 20% |
| Dispersant (styrene-acrylate-methacrylic acid diethanol amine salt copolymer) | 4.5% |
| Ethylene glycol | 30% |
| Water | 45.5% |
| Corrosion inhibitor | |
| Tributyl borate (a reagent manufactured by Kanto Chemical Co., Ltd.) | 0.1% |

When this ink was subjected to the plasma emission spectrometry analysis, the content of alkali metals in the ink was 932 ppm. In addition, the pH of the ink was 9.8.

As a result of the initial image recording test, clear images having an image density not lower that 1.3 could be obtained on each recording paper.

As a result of the reliability test, good images can be recorded without using recovering means. With respect to the liquid contact property of the ink, the thickness change of the PYREX glass #7740 was 0.15 μm and the thickness changes of the 100 surface, 110 surface and 111 surface of silicon were about 0.18 μm, about 0.03 μm and about 0.05 μm, respectively. Such thickness changes of the ink room, ink-flow-regulating portion and nozzles caused no problem for the printer. In addition, the thickness change of the silicon oxide layer was about 3 Å, and such a thickness change of the vibrating plate caused no problem for the printer.

EXAMPLE 13

The procedures for preparation and evaluation of the ink in Example 3 were repeated except that the cyan dye was replaced with the following yellow pigment dispersion in an amount of 20%; the corrosion inhibitor was replaced with the following cationic compound serving as a corrosion inhibitor; the addition quantity of water was changed to 54.6; and the filter was replaced with a filter having openings of 0.8 μm in diameter.

| Yellow pigment dispersion | |
| --- | --- |
| C.I. Pigment Yellow 138 | 25% |
| Dispersant | 8% |
| (Condensation product of naphthalene sulfonate with formalin) | |
| Ammonia water | 1.3% |
| Ethylene glycol | 25% |
| Water | 40.7% |
| Corrosion inhibitor | |
| Cationic polymer | 1.0% |
| (Nippon Shokubai Co., Ltd.) | |

When this ink was subjected to the plasma emission spectrometry analysis, the content of alkali metals in the ink was 886 ppm. In addition, the pH of the ink was 9.1.

As a result of the initial image recording test, clear images having an image density not lower than 0.9 could be obtained on each recording paper.

As a result of the reliability test, good images can be recorded without using recovering means. With respect to the liquid contact property of the ink, the thickness changes of the 100 surface, 110 surface and 111 surface of the silicon substrate were about 0.29 μm, about 0.13 μm and about 0.10 μm, respectively. Such thickness changes of the ink room, ink-flow-regulating portion and nozzles caused no problem for the printer. In addition, the thickness change of the silicon oxide layer was about 5 Å, and such a thickness change of the vibrating plate caused no problem for the printer.

EXAMPLE 14

The procedures for preparation and evaluation of the ink in Example 13 were repeated except that the cationic polymer was replaced with zinc chloride serving as a corrosion inhibitor.

As a result of the initial test, clear images having an image density not lower than 0.9 could be obtained on each recording paper.

As a result of the reliability test, normal images can be recorded without using recovering means. With respect to the liquid contact property of the ink, the thickness change of the 100, 110 and 111 surfaces of silicon were about 0.29 μm, about 0.13 μm and about 0.10 μm, respectively. Such thickness changes of the ink room, ink-flow-regulating portion and nozzles caused no problem for the printer. In addition, the thickness change of the silicon oxide layer was about 5 Å, and such a thickness change of the vibrating plate caused no problem for the printer.

EXAMPLE 15

The procedures for preparation and evaluation of the ink in Example 1 were repeated except that the formulation of the ink was changed as follows; and the filter was replaced with a filer having openings of 0.3 μm in diameter.

| Formulation of ink | |
| --- | --- |
| Cationic yellow dye | 3% |
| (CAYACRYL ED manufactured by Nippon Kayaku Co., Ltd.) | |
| Glycerin | 5% |
| Ethylene glycol | 20% |
| 2-ethyl-1,3-hexanediol | 2.0% |
| Antimildew agent | 0.4% |
| (SUNPACK AP manufactured by San-Ai Oil Co., Ltd.) | |
| Cationic surfactant (benzalkonium chloride) | 1.0% |
| (CATION G-50 manufactured by Sanyo Chemical Industries, Ltd.) | |
| Deionized water | 68.6% |

When this ink was subjected to the plasma emission spectrometry analysis, the content of alkali metals in the ink was 886 ppm. In addition, the pH of the ink was 9.1.

As a result of the initial image recording test, clear images having an image density not lower than 1.2 could be obtained on each recording paper.

As a result of the reliability test, good images can be recorded without using recovering means. With respect to the liquid contact property of the ink, the thickness change of the PYREX glass #7740 was 0.15 μm; and the thickness changes of the 100 surface, 110 surface and 111 surface of silicon were about 0.19 μm, about 0.11 μm and about 0.12 μm, respectively. Such thickness changes of the ink room, ink-flow-regulating portion and nozzles caused no problem for the printer. In addition, the thickness change of the silicon oxide layer was about 5 Å, and such a thickness change of the vibrating plate caused no problem for the printer.

EXAMPLE 16

The procedures for preparation and evaluation of the ink in Example 13 were repeated except that the corrosion inhibitor was replaced with the following compound.

| Corrosion inhibitor | |
| --- | --- |
| Titanium ethylate | 1.0% |

When this ink was subjected to the plasma emission spectrometry analysis, the content of alkali metals in the ink was 886 ppm. In addition, the pH of the ink was 9.1.

As a result of the initial image recording test, clear images having an image density not lower than 1.2 could be obtained on each recording paper.

As a result of the reliability test, good images can be recorded without using recovering means. With respect to the liquid contact property of the ink, the thickness changes of the 100 surface, 110 surface and 111 surface of the silicon substrate were about 0.19 µm, about 0.11 µm and about 0.12 µm, respectively. Such thickness changes of the ink room, ink-flow-regulating portion and nozzles caused no problem for the printer. In addition, the thickness change of the silicon oxide layer was about 5 Å, and such a thickness change of the vibrating plate caused no problem for the printer.

EXAMPLE 17

The procedures for preparation and evaluation of the ink in Example 1 were repeated except that PYREX glass was replaced with a blue glass (soft glass manufactured by HOYA Corp.); the filer was replaced with a filer having openings of 0.3 µm in diameter; and the formulation of the ink was changed as follows:

| | |
|---|---|
| Cationic magenta dye | 3% |
| (CAYACRYL ED manufactured by Nippon Kayaku Co., Ltd.) | |
| Glycerin | 5% |
| Ethylene glycol | 20% |
| OLFIN E1010 | 1.0% |
| (manufactured by Nisshin Chemical Industry Co., Ltd.) | |
| Antimildew agent | 0.4% |
| (SUNPACK AP, manufactured by San-Ai Oil Co., Ltd.) | |
| Deionized water | 70.6% |

When this ink was subjected to the plasma emission spectrometry analysis, the content of alkali metals in the ink was 958 ppm. In addition, the pH of the ink was 9.7.

As a result of the initial image recording test, clear images having an image density not lower than 1.1 could be obtained on each recording paper.

As a result of the reliability test, good images can be recorded without using recovering means. With respect to the liquid contact property of the ink, the thickness change of the blue glass was 0.21 µm and the thickness changes of the 100 surface, 110 surface and 111 surface of silicon were about 0.25 µm, about 0.11 µm and about 0.08 µm, respectively. Such thickness changes of the ink room, ink-flow-regulating portion and nozzles caused no problem for the printer. In addition, the thickness change of the silicon oxide layer was about 5 Å, and such a thickness change of the vibrating plate caused no problem for the printer.

EXAMPLE 18

The procedures for preparation and evaluation of the ink in Example 6 were repeated except that the non-alkali glass was replaced with a blue glass (soft glass manufactured by HOYA Corp.; the yellow dye was replaced with the following magenta pigment dispersion in an amount of 12%; the following cationic compound was used as a corrosion inhibitor; the addition quantity of water was changed to 70.6; and the filter was replaced with a filter having openings of 0.8 µm in diameter.

| | |
|---|---|
| Magenta pigment dispersion | |
| C.I. Pigment Red 122 | 33% |
| (average particle diameter of 120 nm) | |
| Dispersant | 17.5% |
| (dipolyoxyethylene nonylphenol ether phosphoric acid) | |

| -continued | |
|---|---|
| Compound No. 13 | 1.5% |
| Ethylene glycol | 25% |
| Water | 23% |
| Corrosion inhibitor | |
| Zirconium isopropoxide | 1.0% |

When this ink was subjected to the plasma emission spectrometry, the content of alkali metals in the ink was 958 ppm. In addition, the pH of the ink was 9.7.

As a result of the initial image recording test, clear images having an image density not lower than 1.1 could be obtained on each recording paper.

As a result of the reliability test, normal images can be recorded without using recovering means. With respect to the liquid contact property of the ink, the thickness change of the blue glass was 0.21 µm, and the thickness changes of the 100 surface, 110 surface and 111 surface of the silicon substrate were about 0.25 µm, about 0.11 µm and about 0.08 µm, respectively. Such thickness changes of the ink room, ink-flow-regulating portion and nozzles caused no problem for the printer. In addition, the thickness change of the silicon oxide layer was about 5 Å, and such a thickness change of the vibrating plate caused no problem for the printer.

EXAMPLE 19

The procedures for preparation and evaluation of the ink in Example 1 were repeated except that the PYREX glass was replaced with a photosensitive glass manufactured by HOYA Corp.; the filer was replaced with a filer having openings of 0.3 µm in diameter; and the formulation of the ink was changed as follows:

| | |
|---|---|
| Microencapsulated carbon black | 5% |
| (manufactured by Dainippon Ink and Chemicals, Inc., average particle diameter of 110 nm) | |
| Glycerin | 5% |
| Ethylene glycol | 20% |
| OLFIN E1010 | 1.0% |
| Antimildew agent | 0.4% |
| (SUNPACK AP, manufactured by San-Ai Oil Co., Ltd.) | |
| Deionized water | 68.6% |

When this ink was subjected to the plasma emission spectrometry analysis, the content of alkali metals in the ink was 156 ppm. In addition, the pH of the ink was 9.7.

As a result of the initial image recording test, clear images having an image density not lower than 1.0 could be obtained on each recording paper.

As a result of the reliability test, normal images can be recorded without using recovering means. With respect to the liquid contact property of the ink, the thickness change of the photosensitive glass was 0.21 µm and the thickness changes of the 100 surface, 110 surface and 111 surface of silicon were about 0.26 µm, about 0.10 µm and about 0.06 µm, respectively. Such thickness changes of the ink room, ink-flow-regulating portion and nozzles caused no problem for the printer. In addition, the thickness change of the silicon oxide layer was about 4 Å, and such a thickness change of the vibrating plate caused no problem for the printer.

EXAMPLE 20

The procedures for preparation and evaluation of the ink in Example 18 were repeated except that the corrosion inhibitor was replaced with the following compound; and the blue glass was replaced with a photosensitive glass manufactured by HOYA Corp.

| Corrosion inhibitor | |
|---|---|
| Tetramethylammonium silicide | 1.0% |

When this ink was subjected to the plasma emission spectrometry analysis, the content of alkali metals in the ink was 958 ppm. In addition, the pH of the ink was 9.7.

As a result of the initial image recording test, clear images having an image density not lower than 1.1 could be obtained on each recording paper.

As a result of the reliability test, normal images can be recorded without using recovering means. With respect to the liquid contact property of the ink, the thickness change of the photosensitive glass was 0.21 $\mu$m, and the thickness changes of the 100 surface, 110 surface and 111 surface of the silicon substrate were about 0.25 $\mu$m, about 0.11 $\mu$m and about 0.08 $\mu$m, respectively. Such thickness changes of the ink room, ink-flow-regulating portion and nozzles caused no problem for the printer. In addition, the thickness change of the silicon oxide layer was about 5 Å, and such a thickness change of the vibrating plate caused no problem for the printer.

EXAMPLE 21

The procedures for preparation and evaluation of the ink in Example 1 were repeated except that PYREX glass #7740 was replaced with a low-alkali glass (BLC manufactured by Nippon Electric Glass Co. Ltd.); and the black dye was replaced with the following yellow dye in an amount of 3%.

| Yellow dye | |
|---|---|
| PROJECT FAST YELLOW 2 (manufactured by Abysia Co., Ltd.) | 3% |

The alkali metal of PROJECT FAST YELLOW 2 was partially changed to an acid using an ion exchange resin and then the acid was partially changed to hydroxide of the phosphonium compound No. 3 having a hydroxyl ion as a counter ion.

When this ink was subjected to the plasma emission spectrometry analysis, the content of alkali metals in the ink was 630 ppm. In addition, the pH of the ink was 9.6.

As a result of the initial image recording test, clear images having an image density not lower than 0.9 could be obtained on each recording paper.

As a result of the reliability test, good images can be recorded without using recovering means. With respect to the liquid contact property of the ink, the thickness change of the low-alkali glass was 0.21 $\mu$m, and the thickness changes of the 100 surface, 110 surface and 111 surface of the silicon substrate were about 0.40 $\mu$m, about 0.15 $\mu$m and about 0.13 $\mu$m, respectively. Such thickness changes of the ink room, ink-flow-regulating portion and nozzles caused no problem for the printer. In addition, the thickness change of the silicon oxide layer was about 6 Å, and such a thickness change of the vibrating plate caused no problem for the printer.

EXAMPLE 22

The procedures for preparation and evaluation of the ink in Example 21 were repeated except that the hydroxide of the phosphonium compound No. 3 having a hydroxyl ion as a counter ion was replaced with the sulfonium compound No. 29 having a hydroxyl ion as a counter ion.

As a result of the initial image recording test, clear images having an image density not lower than 0.9 could be obtained on each recording paper.

As a result of the reliability test, normal images can be recorded without using recovering means. With respect to the liquid contact property of the ink, the thickness change of the low-alkali glass was 0.21 $\mu$m, and the thickness changes of the 100 surface, 110 surface and 111 surface of the silicon substrate were about 0.40 $\mu$m, about 0.15 $\mu$m and about 0.13 $\mu$m, respectively. Such thickness changes of the ink room, ink-flow-regulating portion and nozzles caused no problem for the printer. In addition, the thickness change of the silicon oxide layer was about 6 Å, and such a thickness change of the vibrating plate caused no problem for the printer.

EXAMPLE 23

The procedures for preparation and evaluation of the ink in Example 1 were repeated except that tetrabutylphosphonium hydroxide was replaced with a mixture of tetrabutylphosphonium hydroxide and tributylsulfonium hydroxide (mixing ratio of 1/1).

As a result of the initial image recording test, clear images having an image density not lower than 1.3 could be obtained on each recording paper.

As a result of the reliability test, good images can be recorded without using recovering means. With respect to the liquid contact property of the ink, the thickness change of PYREX glass #7740 was 0.10 $\mu$m, and the thickness changes of the 100 surface, 110 surface and 111 surface of the silicon substrate were about 0.15 $\mu$m, about 0.04 $\mu$m and about 0.03 $\mu$m, respectively. Such thickness changes of the ink room, ink-flow-regulating portion and nozzles caused no problem for the printer. In addition, the thickness change of the silicon oxide layer was about 3 Å, and such a thickness change of the vibrating plate caused no problem for the printer.

COMPARATIVE EXAMPLE 1

The procedures for preparation and evaluation of the ink in Example 1 were repeated except that tetrabutylphosphonium hydroxide was replaced with lithium hydroxide to control the pH of the ink.

When this ink was subjected to the plasma emission spectrometry analysis, the content of alkali metals in the ink was 940 ppm. In addition, the pH of the ink was 9.8.

As a result of the initial image recording test, clear images having the same image qualities as those of the images obtained in Example 1 could be obtained on each recording paper.

As a result of the reliability test, 8 nozzles of the 48 nozzles had the ink-choking problem due to dissolution of silicon into the ink, resulting in deterioration of solubility of the dye in the ink.

With respect to the liquid contact property of the ink, the thickness change of PYREX glass #7740 was 11.2 $\mu$m, and the thickness changes of the 100 surface, 110 surface and 111 surface of the silicon substrate were about 6.0 $\mu$m, about 3.5 $\mu$m and about 0.60 $\mu$m, respectively. Such thickness changes of the ink room, ink-flow-regulating portion and nozzles caused problems for the printer. In addition, the silicon oxide layer was entirely dissolved into the ink, and such a change of the vibrating plate caused problems for the printer.

COMPARATIVE EXAMPLE 2

The procedures for preparation and evaluation of the ink in Example 2 were repeated except that tributylsulfonium hydroxide was replaced with sodium hydroxide to control the pH of the ink.

When this ink was subjected to the plasma emission spectrometry analysis, the content of alkali metals in the ink was 940 ppm. In addition, the pH of the ink was 9.8.

As a result of the initial image recording test, clear images having the same image qualities as those of the images obtained in Example 1 could be obtained on each recording paper.

As a result of the reliability test, 8 nozzles of the 48 nozzles had the ink-choking problem due to dissolution of silicon into the ink, resulting in deterioration of solubility of the dye in the ink.

With respect to the liquid contact property of the ink, the thickness change of PYREX glass #7740 was 11.2 µm, and the thickness changes of the 100 surface, 110 surface and 111 surface of the silicon substrate were about 6.0 µm, about 3.5 µm and about 0.60 µm, respectively. Such thickness changes of the ink room, ink-flow-regulating portion and nozzles caused problems for the printer. In addition, the silicon oxide layer was entirely dissolved into the ink, and such a change of the vibrating plate caused problems for the printer.

COMPARATIVE EXAMPLE 3

The procedures for preparation and evaluation of the ink in Example 3 were repeated except that tetrabutylphosphonium hydroxide was replaced with sodium hydroxide to control the pH of the ink.

When this ink was subjected to the plasma emission spectrometry analysis, the content of alkali metals in the ink was 1280 ppm. In addition, the pH of the ink was 10.3.

As a result of the initial image recording test, clear images having the same image qualities as those of the images obtained in Example 3 could be obtained on each recording paper.

As a result of the reliability test, 28 nozzles of the 48 nozzles had the ink-choking problem due to dissolution of silicon into the ink, resulting in deterioration of solubility of the dye in the ink.

With respect to the liquid contact property of the ink, the thickness changes of the 100 surface, 110 surface and 111 surface of the silicon substrate were about 8.2 µm, about 4.7 µm and about 0.80 µm, respectively. Such thickness changes of the ink room, ink-flow-regulating portion and nozzles caused problems for the printer. In addition, the silicon oxide layer was entirely dissolved into the ink, and 8 vibrating plates of the 48 vibrating plates thinned and thereby the vibration plates were damaged because the vibrating plates could not endured the vibration.

COMPARATIVE EXAMPLE 4

The procedures for preparation and evaluation of the ink in Example 4 were repeated except that tetrabutylarsonium hydroxide was replaced with potassium hydroxide to control the pH of the ink.

When this ink was subjected to the plasma emission spectrometry analysis, the content of alkali metals in the ink was 1280 ppm. In addition, the pH of the ink was 10.3.

As a result of the initial image recording test, clear images having the same image qualities as those of the images obtained in Example 3 could be obtained on each recording paper.

As a result of the reliability test, 28 nozzles of the 48 nozzles had the ink-choking problem due to dissolution of silicon into the ink, resulting in deterioration of solubility of the dye in the ink.

With respect to the liquid contact property of the ink, the thickness changes of the 100 surface, 110 surface and 111 surface of the silicon substrate were about 8.2 µm, about 4.7 µm and about 0.80 µm, respectively. Such thickness changes of the ink room, ink-flow-regulating portion and nozzles caused problems for the printer. In addition, the silicon oxide layer was entirely dissolved into the ink, and 8 vibrating plates of the 48 vibrating plates thinned and thereby the vibration plates were damaged because the vibrating plates could not endured the vibration.

COMPARATIVE EXAMPLE 5

The procedures for preparation and evaluation of the ink in Example 5 were repeated except that the compound No. 1 was replaced with potassium hydroxide and the compound No. 3 was replaced with lithium hydroxide, to control the pH of the ink.

When this ink was subjected to the plasma emission spectrometry analysis, the content of alkali metals in the ink was 970 ppm. In addition, the pH of the ink was 9.6.

As a result of the initial image recording test, clear images having the same image qualities as those of the images obtained in Example 5 could be obtained on each recording paper.

As a result of the reliability test, 12 nozzles of the 48 nozzles had the ink-choking problem due to dissolution of silicon into the ink, resulting in deterioration of solubility of the dye in the ink.

With respect to the liquid contact property of the ink, the thickness change of the non-alkali glass (OA-2 manufactured by Nippon Electric Glass Co., Ltd.) was 13.9 µm, and the thickness changes of the 100 surface, 110 surface and 111 surface of the silicon substrate were about 6.2 µm, about 3.6 µm and about 0.60 µm, respectively. Such thickness changes of the ink room, ink-flow-regulating portion and nozzles caused problems for the printer. In addition, the silicon oxide layer was entirely dissolved into the ink, and such a change of the vibrating plate caused problems for the printer.

COMPARATIVE EXAMPLE 6

The procedures for preparation and evaluation of the ink in Example 6 were repeated except that the compound No. 27 was replaced with sodium hydroxide and the compound No. 29 was replaced with lithium hydroxide, to control the pH of the ink.

When this ink was subjected to the plasma emission spectrometry analysis, the content of alkali metals in the ink was 970 ppm. In addition, the pH of the ink was 9.6.

As a result of the initial image recording test, clear images having the same image qualities as those of the images obtained in Example 6 could be obtained on each recording paper.

As a result of the reliability test, 12 nozzles of the 48 nozzles had the ink-choking problem due to dissolution of silicon into the ink, resulting in deterioration of solubility of the dye in the ink.

With respect to the liquid contact property of the ink, the thickness change of the non-alkali glass (OA-2 manufactured by Nippon Electric Glass Co., Ltd.) was 13.9 µm, and the thickness changes of the 100 surface, 110 surface and 111 surface of the silicon substrate were about 6.2 μm, about 3.6 μm and about 0.60 μm, respectively. Such thickness changes of the ink room, ink-flow-regulating portion and nozzles caused problems for the printer. In addition, the silicon oxide layer was entirely dissolved into the ink, and such a change of the vibrating plate caused problems for the printer.

COMPARATIVE EXAMPLE 7

The procedures for preparation and evaluation of the ink in Example 7 were repeated except that the corrosion inhibitor was replaced with potassium hydroxide to control the pH of the ink.

When this ink was subjected to the plasma emission spectrometry analysis, the content of alkali metals in the ink was 810 ppm. In addition, the pH of the ink was 10.1.

As a result of the initial image recording test, clear images having the same image qualities as those of the images obtained in Example 7 could be obtained on each recording paper.

As a result of the reliability test, 4 nozzles of the 48 nozzles had the ink-choking problem due to dissolution of silicon into the ink, resulting in deterioration of solubility of the dye in the ink.

With respect to the liquid contact property of the ink, the thickness changes of the 100 surface, 110 surface and 111 surface of the silicon substrate were about 5.3 μm, about 3.1 μm and about 0.50 μm, respectively. Such thickness changes of the ink room, ink-flow-regulating portion and nozzles caused problems for the printer. In addition, the silicon oxide layer was entirely dissolved into the ink, and such a change of the vibrating plate caused problems for the printer.

COMPARATIVE EXAMPLE 8

The procedures for preparation and evaluation of the ink in Example 8 were repeated except that the corrosion inhibitor was replaced with sodium hydroxide to control the pH of the ink.

When this ink was subjected to the plasma emission spectrometry analysis, the content of alkali metals in the ink was 810 ppm. In addition, the pH of the ink was 10.1.

As a result of the initial image recording test, clear images having the same image qualities as those of the images obtained in Example 8 could be obtained on each recording paper.

As a result of the reliability test, 4 nozzles of the 48 nozzles had the ink-choking problem due to dissolution of silicon into the ink, resulting in deterioration of solubility of the dye in the ink.

With respect to the liquid contact property of the ink, the thickness changes of the 100 surface, 110 surface and 111 surface of the silicon substrate were about 5.3 μm, about 3.1 μm and about 0.50 μm, respectively. Such thickness changes of the ink room, ink-flow-regulating portion and nozzles caused problems for the printer. In addition, the silicon oxide layer was entirely dissolved into the ink, and such a change of the vibrating plate caused problems for the printer.

COMPARATIVE EXAMPLE 9

The procedures for preparation and evaluation of the ink in Example 9 were repeated except that the corrosion inhibitor was replaced with sodium hydroxide to control the pH of the ink.

When this ink was subjected to the plasma emission spectrometry analysis, the content of alkali metals in the ink was 870 ppm. In addition, the pH of the ink was 8.3.

As a result of the initial image recording test, clear images having the same image qualities as those of the images obtained in Example 9 could be obtained on each recording paper.

As a result of the reliability test, 7 nozzles of the 48 nozzles had the ink-choking problem due to dissolution of silicon into the ink, resulting in deterioration of solubility of the dye in the ink.

With respect to the liquid contact property of the ink, the thickness changes of the 100 surface, 110 surface and 111 surface of the silicon substrate were about 5.8 μm, about 3.4 μm and about 0.60 μm, respectively. Such thickness changes of the ink room, ink-flow-regulating portion and nozzles caused problems for the printer. In addition, the silicon oxide layer was entirely dissolved into the ink, and such a change of the vibrating plate caused problems for the printer.

COMPARATIVE EXAMPLE 10

The procedures for preparation and evaluation of the ink in Example 12 were repeated except that tributyl borate (corrosion inhibitor) was replaced with lithium hydroxide to control the pH of the ink.

When this ink was subjected to the plasma emission spectrometry analysis, the content of alkali metals in the ink was 870 ppm. In addition, the pH of the ink was 8.3.

As a result of the initial image recording test, clear images having the same image qualities as those of the images obtained in Example 12 could be obtained on each recording paper.

As a result of the reliability test, 7 nozzles of the 48 nozzles had the ink-choking problem due to dissolution of silicon into the ink, resulting in deterioration of solubility of the dye in the ink.

With respect to the liquid contact property of the ink, the thickness changes of the 100 surface, 110 surface and 111 surface of the silicon substrate were about 5.5 μm, about 3.3 μm and about 0.55 μm, respectively. Such thickness changes of the ink room, ink-flow-regulating and nozzles caused problems for the printer. In addition, the silicon oxide layer was entirely dissolved into the ink, and such a change of the vibrating plate caused problems for the printer.

Measurements of zeta potentials 1 and 2

The zeta potential (zeta potential 1) of each of the inks of Examples 1 to 22 and Comparative Examples 1 to 10 was measured. Further, the zeta potential (zeta potential 2) between the colorant in each ink and the substrate (i.e., the glass substrate, silicon substrate, and silicon substrate having a silicon oxide layer) was also measured.

The zeta potentials 1 and 2 were measured using an elecctrophoretic apparatus, LES-8000 manufactured by Ohtsuka Electric Co., Ltd., which uses a laser Doppler method. The zeta potentials 1 and 2 were measured when the pH of the dye inks was 10.5 and the pH of the pigment inks was 10.6. The zeta potential of the pigment inks could be measured but the zeta potential of the dye inks was measured while using monitor particles.

The procedure of measurements of zeta potentials 1 and 2 is as follows:

(1) A cell is set in the measuring instrument LES-8000 and the instrument is warmed up;

(2) The following parameters concerning solvent and particles used are input to the instrument:
Solvent: density, viscosity, temperature coefficient of viscosity, specific dielectric constant and sonic speed
Particles: density, particle diameter and concentration (% by weight or by volume)

(3) 10 ml of a standard particle liquid (Ludox TM manufactured by ESA Corp) is injected into the cell to measure the zeta potential thereof
(4) If the zeta potential of the standard particle liquid is −38 mV ± 1 mV, it is considered that the instrument is in a normal condition;
(5) The cell is cleaned with pure water;
(6) Parameters of an ink sample to be measured are input to the instrument;
(7) 10 ml of the ink sample is added into the cell to measure the zeta potential 1 (in this case, if the ink is a dye ink, monitor particles (polystyrene particles having a particle diameter of 204 nm and coated with sodium dodecylsulfate) are added to the ink in an amount of 0.2% based on the ink weight);
(8) The cell is cleaned with pure water;
(9) The zeta potential of another ink sample is measured by repeating the procedures (6)–(8).

Figure 6A:
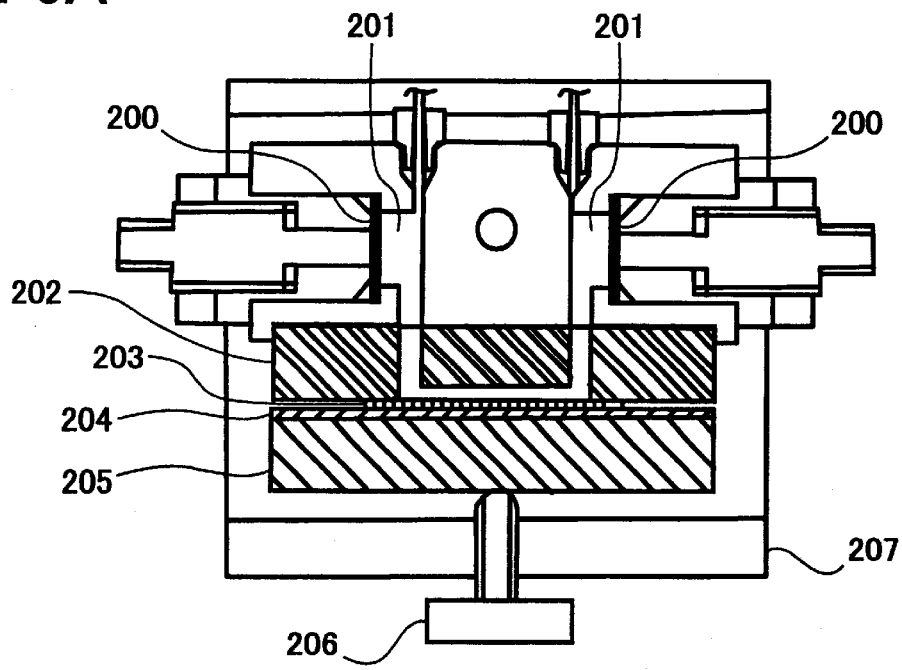
FIG. 6A is a schematic view illustrating the cross section of the cell of a zeta potential measuring instrument.
Figure 6B:
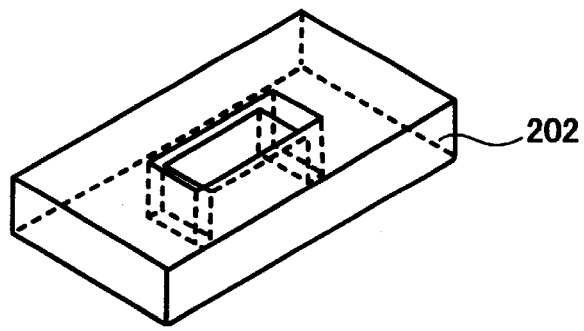
FIGS. 6B and 6C are a perspective view and a plan view of the cell as shown in FIG. 6A.
Figure 6C:
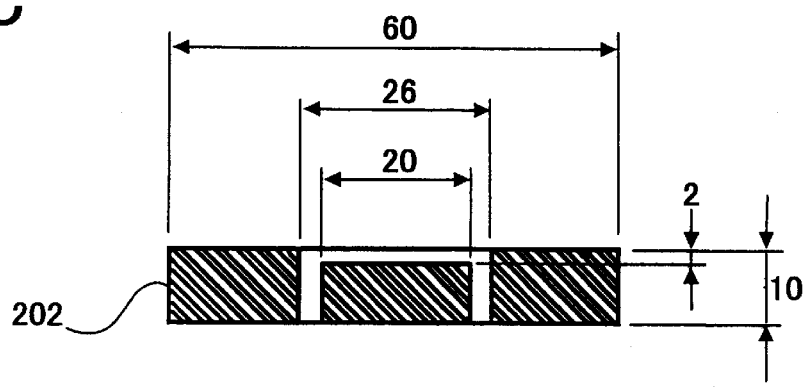

When the zeta potential 2 (i.e., the zeta potential between the colorant and a material such as glass, silicon, and silicon oxide) is measured, a cell as shown in FIGS. 6A to 6C is used. In FIG. 6A, numeral 202 denotes the cell, and an ink sample 201 is injected in the cell. Numerals 203 and 204 denote a plate of the material (such as glass, silicon and silicon oxide), and a presser foot which presses the plate toward the cell together with another presser foot 205 whose temperature is controlled. Numerals 200, 206 and 207 denote a platinum electrode, a sample holding screw and a cell block. FIGS. 6B and 6C are a perspective view and a plan view of the cell 202, respectively.

In this instrument, zeta potential is calculated using a Mori-Okamoto's formula.

Measurements of Oxidation/Reduction Current

The relationship between potential and oxidation/reduction current between the substrate and each ink was determined using cyclic voltammetry. The instrument used was POTENTIOSTAT/GALVANOSTAT HA-501G (using ARBITRARY FUNCTION GENERATOR HB-105) manufactured by HOKUTO DENKO Ltd. A saturated calomel electrode (SCE) was used as the reference electrode. The potential was measured in the range of from −3.0 to 5.0 V (vs SCE) and the oxidation/reduction current was measured in the range of from −1.5 to 2.0 $\mu A/cm^2$ (Pt.)

The results are shown in Table 3.

TABLE 3

|  | Zeta potential 1 (mV) | Zeta potential 2 (mV) | Oxidation/reduction current ($\mu A/cm^2$ (Pt.)) |
| --- | --- | --- | --- |
| Ex. 1 | −46.51 | −2.13 | Not greater 1.0 |
| Ex. 2 | −37.20 | −32.53 | Not greater 1.0 |
| Ex. 3 | −28.56 | −20.60 | Not greater 1.0 |
| Ex. 4 | −35.15 | −37.48 | Not greater 1.0 |
| Ex. 5 | −31.50 | −22.37 | Not greater 1.0 |
| Ex. 6 | −36.88 | −15.46 | Not greater 1.0 |
| Ex. 7 | −31.75 | −37.35 | Not greater 1.0 |
| Ex. 8 | −43.52 | −11.00 | Not greater 1.0 |
| Ex. 9 | −46.76 | −8.24 | Not greater 1.0 |
| Ex. 10 | −48.24 | −8.64 | Not greater 1.0 |
| Ex. 11 | −36.83 | −5.84 | Not greater 1.0 |
| Ex. 12 | −39.41 | −24.82 | Not greater 1.0 |
| Ex. 13 | −35.28 | −17.54 | Not greater 1.0 |
| Ex. 14 | −48.05 | −26.91 | Not greater 1.0 |
| Ex. 15 | −42.87 | −17.64 | Not greater 1.0 |
| Ex. 16 | −35.40 | −20.64 | Not greater 1.0 |
| Ex. 17 | −38.24 | −38.55 | Not greater 1.0 |
| Ex. 18 | −42.10 | −31.45 | Not greater 1.0 |

TABLE 3-continued

|  | Zeta potential 1 (mV) | Zeta potential 2 (mV) | Oxidation/reduction current ($\mu A/cm^2$ (Pt.)) |
| --- | --- | --- | --- |
| Ex. 19 | −31.34 | −10.89 | Not greater 1.0 |
| Ex. 20 | −29.81 | −4.26 | Not greater 1.0 |
| Ex. 21 | −30.54 | −6.84 | Not greater 1.0 |
| Ex. 22 | −37.14 | −12.64 | Not greater 1.0 |
| Ex. 23 | −39.37 | −10.25 | Not greater 1.0 |
| Comp. Ex. 1 | −10.01 | −128.53 | Greater 1.0 |
| Comp. Ex. 2 | −6.36 | −167.86 | Greater 1.0 |
| Comp. Ex. 3 | −14.15 | −103.98 | Greater 1.0 |
| Comp. Ex. 4 | −9.04 | −129.01 | Greater 1.0 |
| Comp. Ex. 5 | −8.82 | −117.74 | Greater 1.0 |
| Comp. Ex. 6 | −16.91 | −135.73 | Greater 1.0 |
| Comp. Ex. 7 | −6.59 | −70.10 | Greater 1.0 |
| Comp. Ex. 8 | −8.46 | −113.80 | Greater 1.0 |
| Comp. Ex. 9 | −7.93 | −86.68 | Greater 1.0 |
| Comp. Ex. 10 | −15.69 | −91.59 | Greater 1.0 |

As can be understood from Table 3, when the zeta potential 1 of an ink is not greater than −20 mV and the zeta potential 2 between a material and the colorant of the ink is from 0 to −50 mV at a pH of from 6.5 to 11.5, dissolution of the material such as glass, silicon and silicon oxide into the ink can be prevented. In addition, it is found that the oxidation/reduction current flowing between the material and the ink is from 0 to 1.0 $\mu A/cm^2$ (Pt.) when the potential range is from −2.0 to 5.0 V against SCE.

To the contrary, the zeta potentials 1 and 2 of the comparative inks are out of the ranges, and dissolution of the material such as glass, silicon and silicon oxide into the ink seriously occurs.

EXAMPLE 24

The following components were mixed while stirring.

| (Microcapsule liquid 1) | |
| --- | --- |
| Styrene-acrylic acid-methacrylic acid resin | 20.0% |
| Carbon black | 20.0% |
| Methyl ethyl ketone | 55.0% |
| Diethanol amine | 5.0% |

The mixture was subjected to a dispersion treatment using NANOMIZER. Then water was added thereto to change the phase, i.e., to prepare an aqueous emulsion. Then the emulsion was heated to evaporate the organic solvents and a part of water, resulting in preparation of a microcapsule dispersion having a solid content of 10%.

Then the following components were mixed and subjected to filtering using a TEFLON filter having openings of 0.8 $\mu m$ in diameter to prepare an ink composition having a pigment content of 3%.

| (Formulation of ink 1) | |
| --- | --- |
| Microcapsule liquid 1 prepared above | 20.0% |
| N-methyl-2-pyrrolidone | 5.0% |
| Diethyleneglycol monobutyl ether | 10.0% |
| Deionized water | 65.0% |

Thus, a black ink composition was prepared.

The ink composition of Example 24 was evaluated as follows:

(1) Initial image recording test

The ink was evaluated by the test method T(1) mentioned above.

(2) Reliability rest

The ink was evaluated by the test method (T2) mentioned above.

(3) Image density, and backside density (penetrated image density)

The image density (OD) of an image recorded on a paper in T(1) and the density (ODr) of the backside of the paper having the image were measured by a reflection type spectrophotometric densitometer manufactured by X-Rite. The backside density was obtained as follows:

$$Backside\ density\ ODr=ODb-OD_0$$

wherein ODb represents the density of the backside of the paper having the image measured by the densitometer, and $OD_0$ represents the density of the paper itself.

The greater the backside density of an image, the more the image penetrates into the paper.

The recorded images were graded as follows with respect to image density:

◯: the image density is not less than 1.35 (black images) or 0.90 (color images). (good)

X: the image density is less than 1.35 (black images) or 0.90 (color images). (poor)

The recorded images were graded as follows with respect to backside density:

◯: the backside density is not greater than 0.05 (black images) or 0.04 (color images). (good)

X: the image density is greater than 0.05 (black images) or 0.04 (color images). (poor)

(4) Image blurring

Character images recorded on a marketed plain paper by each ink were observed to determine whether the images are blurred.

The recorded images were graded as follows with respect to blurring:

◯: Images are hardly blurred. (good)

Δ: Images are slightly blurred.

X: Images are seriously blurred, and the image qualities are poor.

(5) Preservability of ink

Each ink contained in a polyethylene container was preserved at locations at each temperature of −20° C., 0° C., 4° C., 20° C., 50° C. and 70° C. for 3 months. The viscosity, surface tension, electroconductivity and average particle diameter of the ink before and after each preservation test were measured. The ink whose viscosity, surface tension and electroconductivity do not change and which has a particle diameter not greater than 1 μm is defined as an ink having good preservability.

(6) Light resistance of image

Recorded images were exposed to light for 120 hours using a fade meter having a xenon ark lamp while heated at 63° C. The image densities of the images before and after the test using the reflection type spectrophotometric densitometer manufactured by X-Rite.

The fade rate of the images was determined to evaluate the light resistance of the images.

$$Fade\ rate\ (\%)=[1-(IDa/IDb)]\times 100$$

wherein IDa represents the image density of an image after the test and IDb represents the image density of the image before the test.

(7) Water resistance of image

Images were dipped in water at 25° C. for 5 minutes.

The fade rate of the images was determined to evaluate the light resistance of the images.

$$Fade\ rate\ (\%)=[1-(IDa/IDb)]\times 100$$

wherein IDa represents the image density of an image after the dipping test and IDb represents the image density of the image before the dipping test.

(8) Zeta potential 1

The zeta potential 1 of the particles dispersed in an ink was measured using ESA-8000 manufactured by Matec Applied Sciences Co.

(9) Initial average particle diameter

The initial particle diameter of the particles dispersed in an ink was measured by MICROTRAC UPA150 manufactured by Leeds & Northrup Co.

As can be understood from Table 4, clear images were recorded in the initial image test T(1). In addition clear images were recorded in the reliability test T(2) without using recovering means. With respect to the liquid contact property of the ink, the thickness changes of the 100 surface, 110 surface and 111 surface of the silicon substrate were about 0.18 μm, about 0.08 μm and about 0.05 μm, respectively. Such thickness changes of the ink room, ink-flow-regulating portion and nozzles caused no problem for the printer. In addition, the thickness change of the silicon oxide layer was about 5 Å, and such a thickness change of the vibrating plate caused no problem for the printer.

EXAMPLE 25

The following components were mixed while agitating.

| (Microcapsule liquid 2) | |
| --- | --- |
| C.I. Pigment Yellow 74 | 20.0% |
| Styrene-acrylic acid | 30.0% |
| (acid value of 180, molecular weight of 25,000) | |
| Glycerin | 2.0% |
| Methyl ethyl ketone | 48.0% |

The mixture was subjected to a phase-change emulsifying treatment in water using sodium hydroxide as a neutralizing agent. Then methyl ethyl ketone was removed from the emulsion. Thus, a microcapsule dispersion having a solid content of 30% by weight.

The following components were mixed and subjected to filtering using a TEFLON filter having openings of 0.8 μm in diameter. Thus an ink composition having a pigment content of 3% was prepared.

| (Formulation of ink 2) | |
| --- | --- |
| Microcapsule liquid 2 | 10.0% |
| Glycerin | 15.0% |
| Isopropyl alcohol | 5.0% |
| Deionized water | 70.0% |

As can be understood from Table 4, clear images were recorded in the initial image test T(1). In addition clear images were recorded in the reliability test T(2) without using recovering means. With respect to the liquid contact property of the ink, the thickness changes of the 100 surface, 110 surface and 111 surface of the silicon substrate were about 0.13 μm, about 0.06 μm and about 0.03 μm, respectively. Such thickness changes of the ink room, ink-flow-regulating portion and nozzles caused no problem for the printer. In addition, the thickness change of the silicon oxide layer was about 4 Å, and such a thickness change of the vibrating plate caused no problem for the printer.

EXAMPLE 26

The following components were mixed while stirring.

| (Microcapsule liquid 3) | |
| --- | --- |
| C.I. Pigment Red 122 | 10.0% |
| Polyisocyanate | 10.0% |
| Ethyl acetate | 50.0% |
| Polyvinyl alcohol | 3.0% |
| Deionized water | 27.0% |

The mixture was subjected to an emulsifying treatment using a homogenizer. Then 10% aqueous solution of triethylene diamine was added to the emulsion while stirring. Then the mixture was heated to prepare a microcapsule dispersion having a solid content of 30% by weight.

The following components were mixed and subjected to filtering using a TEFLON filter having openings of 0.8 μm in diameter. Thus an ink composition having a pigment content of 3% was prepared.

| (Formulation of ink 3) | |
| --- | --- |
| Microcapsule liquid 3 | 20.0% |
| Polyoxyethylene alkylphenyl ether | 0.8% |
| Triethylene glycol | 10.0% |
| Deionized water | 69.2% |

As can be understood from Table 4, clear images were recorded in the initial image test T(1). In addition clear images were recorded in the reliability test T(2) without using recovering means. With respect to the liquid contact property of the ink, the thickness changes of the 100 surface, 110 surface and 111 surface of the silicon substrate were about 0.14 μm, about 0.09 μm and about 0.05 μm, respectively. Such thickness changes of the ink room, ink-flow-regulating portion and nozzles caused no problem for the printer. In addition, the thickness change of the silicon oxide layer was about 5 Å, and such a thickness change of the vibrating plate caused no problem for the printer.

EXAMPLE 27

The following components were mixed well and kneaded.

| (Microcapsule liquid 4) | |
| --- | --- |
| C.I. Pigment Blue 15:3 | 10.0% |
| Styrene-acrylic acid-methacrylic acid copolymer | 10.0% |

Then the mixture was mixed with the following components and subjected to a dispersion treatment using a nanomizer.

| | |
| --- | --- |
| Triethanol amine | 2.0% |
| Glycerin | 2.0% |
| Methyl ethyl ketone | 20.0% |
| Isopropyl alcohol | 10.0% |
| Deionized water | 46.0% |

The mixture was subjected to a phase-change emulsifying treatment. Then the organic solvents and part of water were removed from the mixture to prepare a microcapsule dispersion having a solid content of 20% by weight.

The following components were mixed and subjected to filtering using a TEFLON filter having openings of 0.8 μm in diameter. Thus an ink composition having a pigment content of 5% was prepared.

| (Formulation of ink 4) | |
| --- | --- |
| Microcapsule liquid 4 | 20.0% |
| Triethyleneglycol monobutyl ether | 3.0% |
| Thiodiglycol | 10.0% |
| N-methyl-2-pyrrolidone | 5.0% |
| Deionized water | 62.0% |

As can be understood from Table 4, clear images were recorded in the initial image test T(1). In addition clear images were recorded in the reliability test T(2) without using recovering means. With respect to the liquid contact property of the ink, the thickness changes of the 100 surface, 110 surface and 111 surface of the silicon substrate were about 0.22 μm, about 0.15 μm and about 0.08 μm, respectively. Such thickness changes of the ink room, ink-flow-regulating portion and nozzles caused no problem for the printer. In addition, the thickness change of the silicon oxide layer was about 3 Å, and such a thickness change of the vibrating plate caused no problem for the printer.

COMPARATIVE EXAMPLE 11

The following components were mixed with a homogenizer and then dispersed using a nanomizer to prepare a pigment dispersion 1.

| (Pigment dispersion 1) | |
| --- | --- |
| Carbon black whose surface was subjected to a plasma treatment | 10.0% |
| Styrene-maleic anhydride copolymer | 5.0% |
| Deionized water | 85.0% |

The following components were mixed and subjected to a filtering treatment using a TEFLON filer having openings of 0.8 μm in diameter to prepare an ink 5.

| (Formulation of ink 5) | |
|---|---|
| Pigment dispersion 1 | 50.0% |
| Diethylene glycol | 10.0% |
| N-methyl-2-pyrrolidone | 5.0% |
| Diethyleneglycol monobutyl ether | 2.0% |
| Deionized water | 33.0% |

As can be understood from Table 4, clear images having the same image qualities as those of the images obtained in Example 1 were recorded in the initial image test T(1). However, in the reliability test T(2), 10 nozzles of the 48 nozzles were choked with agglomerated pigment caused by dissolution of silicon into the ink.

With respect to the liquid contact property of the ink, the thickness changes of the 100 surface, 110 surface and 111 surface of the silicon substrate were about 6.1 μm, about 4.1 μm and about 0.72 μm, respectively. Such thickness changes of the ink room, ink-flow-regulating portion and nozzles caused problems for the printer. In addition, the silicon oxide layer was perfectly dissolved into the ink, and such a thickness change of the vibrating plate caused problems for the printer. The ink had no problem with respect to the preservability.

COMPARATIVE EXAMPLE 12

The procedures for preparation of the pigment dispersion and ink and evaluation of the ink in Comparative Example 11 were repeated except that the formulations of the pigment dispersion and ink were changed as follows.

| (Pigment dispersion 2) | |
|---|---|
| C.I. Pigment Yellow 13 | 10.0% |
| Lauryltrimethylammonium chloride | 5.0% |
| Deionized water | 85.0% |
| (Formulation of ink 6) | |
| Pigment dispersion 2 | 50.0% |
| Glycerin | 15.0% |
| Isopropyl alcohol | 5.0% |
| Deionized water | 30.0% |

As can be understood from Table 4, clear images having the same image qualities as those of the images obtained in Example 1 were recorded in the initial image test T(1). However, in the reliability test T(2), 25 nozzles of the 48 nozzles were choked with agglomerated pigment caused by dissolution of silicon into the ink.

With respect to the liquid contact property of the ink, the thickness changes of the 100 surface, 110 surface and 111 surface of the silicon substrate were about 7.9 μm, about 3.9 μm and about 0.64 μm, respectively. Such thickness changes of the ink room, ink-flow-regulating portion and nozzles caused problems for the printer. In addition, the silicon oxide layer was perfectly dissolved into the ink, and 10 vibrating plates of the 48 vibrating plates thinned and therefore damaged because the vibrating plate could not endure the vibration. The ink had no problem with respect to the preservability.

COMPARATIVE EXAMPLE 13

The procedures for preparation of the pigment dispersion and ink and evaluation of the ink in Comparative Example 11 were repeated except that the formulations of the pigment dispersion and ink were changed as follows.

| (Pigment dispersion 3) | |
|---|---|
| C.I. Pigment Red 122 | 10.0% |
| Polyoxyethylene polyoxypropyleneoctyl ether | 5.0% |
| Deionized water | 85.0% |
| (Formulation of ink 7) | |
| Pigment dispersion 3 | 50.0% |
| Polyoxyethylene alkylphenyl ether | 0.8% |
| Triethylene glycol | 10.0% |
| Deionized water | 39.2% |

As can be understood from Table 4, clear images having the same image qualities as those of the images obtained in Example 1 were recorded in the initial image test T(1). However, in the reliability test T(2), 12 nozzles of the 48 nozzles were choked with agglomerated pigment caused by dissolution of silicon into the ink.

With respect to the liquid contact property of the ink, the thickness changes of the 100 surface, 110 surface and 111 surface of the silicon substrate were about 7.2 μm, about 3.3 μm and about 0.81 μm respectively. Such thickness changes of the ink room, ink-flow-regulating portion and nozzles caused problems for the printer. In addition, the silicon oxide layer was perfectly dissolved into the ink, and such a thickness change of the vibrating plate caused problems for the printer. The ink had no problem with respect to the preservability.

COMPARATIVE EXAMPLE 14

The procedures for preparation of the pigment dispersion and ink and evaluation of the ink in Comparative Example 11 were repeated except that the formulations of the pigment dispersion and ink were changed as follows.

| (Pigment dispersion 4) | |
|---|---|
| C.I. Pigment Blue 15:3 | 10.0% |
| Dipolyoxyethlene nonylphenol ether phosphate | 5.0% |
| Deionized water | 85.0% |
| (Formulation of ink 8) | |
| Pigment dispersion 4 | 50.0% |
| Triethyleneglycol monobutyl ether | 3.0% |
| Thiodiglycol | 10.0% |
| N-methyl-2-pyrrolidone | 5.0% |
| Deionized water | 32.0% |

As can be understood from Table 4, clear images having the same image qualities as those of the images obtained in Example 1 were recorded in the initial image test T(1). However, in the reliability test T(2), 4 nozzles of the 48 nozzles were choked with agglomerated pigment caused by dissolution of silicon into the ink.

With respect to the liquid contact property of the ink, the thickness changes of the 100 surface, 110 surface and 111 surface of the silicon substrate were about 6.8 μm, about 2.4 μm and about 0.70 μm, respectively. Such thickness changes of the ink room, ink-flow-regulating portion and nozzles caused problems for the printer. In addition, the silicon oxide layer was perfectly dissolved into the ink, and such a thickness change of the vibrating plate caused problems for the printer. The ink had no problem with respect to the preservability.

COMPARATIVE EXAMPLE 15

The procedures for preparation of the pigment dispersion and ink and evaluation of the ink in Comparative Example 11 were repeated except that the formulation of ink was changed as follows.

| (Formulation of ink 9) | |
|---|---|
| Microcapsule liquid 1 | 60.0% |
| SURFINOL 465 | 1.2% |
| Triethanole amine | 10.0% |
| Deionized water | 28.8% |

In the initial image test T(1), 5 nozzles of the 48 nozzles were choked with agglomerated pigment. After a head cleaning operation was performed three times, images as shown in FIG. 4 (poor images) could be recorded. In the reliability test T(2), after seven cleaning operations, the ink was discharged from all the nozzles.

With respect to the liquid contact property of the ink, the thickness changes of the 100 surface, 110 surface and 111 surface of the silicon substrate were about 0.38 $\mu$m, about 0.19 $\mu$m and about 0.11 $\mu$m, respectively. Such thickness changes of the ink room, ink-flow-regulating portion and nozzles caused no problem for the printer. In addition, the thickness change of the silicon oxide layer was about 7 Å, and such a thickness change of the vibrating plate caused no problem for the printer. After the preservability test, the average particle diameter of the microcapsule increased to 282 nm from 218 nm.

TABLE 4

| | OD | ODr | Blur-ring | Light resis-tance | Water Resistance | Zeta Potential 1 (mV) | Initial Particle diame-ter (nm) |
|---|---|---|---|---|---|---|---|
| Ex. 24 | ○ | ○ | ○ | 0.05 | 0.11 | −24.5 | 98 |
| Comp. Ex. 11 | ○ | X | ○ | 0.08 | 5.9 | −17.6 | 102 |
| Ex. 25 | ○ | ○ | ○ | 1.2 | 2.1 | −34.1 | 121 |
| Comp. Ex. 12 | ○ | X | ○ | 25.3 | 11.2 | −12.4 | 108 |
| Ex. 26 | ○ | ○ | ○ | 2.1 | 0.95 | −27.1 | 124 |
| Comp. Ex. 13 | ○ | X | ○ | 4.5 | 9.6 | −18.7 | 138 |
| Ex. 27 | ○ | ○ | ○ | 0.9 | 1.1 | −30.8 | 138 |
| Comp. Ex. 14 | ○ | X | ○ | 3.8 | 5.2 | −15.5 | 116 |
| Comp. Ex. 15 | X | X | X | 0.07 | 0.13 | −9.7 | 218 |

Effects of the Present Invention

Since the ink composition of the present invention has a zeta potential 2 (i.e., a zeta potential between a material (e.g., glass, silicon, and their oxides and nitrides, metals and organic compounds) constituting members of the recording head for which the ink is used) of from 0 to −50 mV at a pH of from 6.5 to 11.5, dissolution of the material into the ink can be avoided. Therefore, problems in which image qualities deteriorate and ink discharging cannot be properly performed due to change of size of ink drops and ink discharging speed, which is caused by change and damage of the members of the recording head can be avoided. In addition, a problem in which and the recording head is damaged due to deterioration of adhesion strength of the members of the recording head can be avoided. Further, an ink-choking problem in which the material dissolved in the ink solidifies in a nozzle and thereby the ink cannot be properly discharged or cannot be discharged can be avoided, which is caused by dissolution of the above-mentioned material into the ink.

When the ink composition further has a zeta potential 1 (i.e., a zeta potential of the ink) not greater than −20 V, the above-mentioned effects of the present invention can be enhanced.

When the ink composition includes at least one of cationic compound (e.g., cationic surfactants, cationic resins, cationic dyes, cationic pigments, cationic particles, etc.), a cationic ion (e.g., phosphonium ion, sulfonium ion, arsonium ion, beryllium ion, aluminum ion, zinc ion, titanium ion, zirconium ion, silicate ion, etc.), acetylene compounds, boron compounds and resin particles, the above-mentioned effects of the present invention can be enhanced because the ink is adsorbed on the material constituting the recording head and tends to remain thereon.

When the pH of the ink composition is from 7 to 10, the above-mentioned effects can be enhanced because the ink is adsorbed on the material constituting the recording head and tends to remain thereon.

When the colorant is microencapsulated while the zeta potential 1 is maintained so as to be not greater than −20 mV, dissolution of the material into the ink can be avoided. Therefore, problems in which image qualities deteriorate and ink discharging cannot be properly performed due to change of size of ink drops and ink discharging speed, which is caused by change of the members of the recording head can be avoided. In addition, a problem in which and the recording head is damaged due to deterioration of adhesion strength of the members of the recording head can be avoided. Further, an ink-choking problem in which the material dissolved in the ink solidifies in a nozzle and thereby the ink cannot be properly discharged or cannot be discharged can be avoided, which is caused by dissolution of the above-mentioned material into the ink. In addition, the resultant images are clear and are not blurred, and have good light resistance and water resistance.

Since the inkjet recording method and apparatus, and ink cartridge of the present invention use the ink composition, images having good image qualities can be recorded for a long period of time without causing the problems mentioned above when the above-mentioned materials, such as glass, silicon, and their oxides and nitrides, metals and organic materials, are used for the members of the recording head which contact the ink.

In another aspect of the present invention, a method for adjusting the zeta potential 1 or 2 is provided which includes adding a corrosion inhibitor to adjust the zeta potential 1 or 2 so as to be not greater than −20 mV or from 0 to −50 mV at a pH of from 6.5 to 11.5. Specific examples of the corrosion inhibitor are mentioned above.

This document claims priority and contains subject matter related to Japanese Patent Applications No. 2001-83770, 2001-13597 and 2001-289930, filed on Mar. 22, 2001, Jan. 22, 2001, and Sep. 21, 2001, respectively, incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. An ink composition comprising:
   a colorant; and
   a solvent, wherein a zeta potential 2 between the colorant and at least one material selected from the group consisting of glass, silicon, silicon oxide, titanium oxide, chromium oxide, titanium nitride, silicon nitride, zirconium and polyimide is from 0 to −50 mV at a pH of from 6.5 to 11.5.

2. The ink composition according to claim 1, further having an ink zeta potential 1 not greater than −20 mV at a pH of from 6.5 to 11.5.

3. The ink composition according to claim 1, wherein the colorant is a colorant covered with a resin or a colored particulate resin.

4. The ink composition according to claim 1, wherein the colorant comprises a cationic colorant.

5. The ink composition according to claim 4, wherein the cationic colorant is a colorant selected from the group consisting of cationic dyes, cationic carbon black and cationic pigments.

6. The ink composition according to claim 1, further comprising a corrosion inhibitor.

7. The ink composition according to claim 6, wherein the corrosion inhibitor comprises a cationic compound selected from the group consisting of cationic resins and cationic surfactants.

8. The ink composition according to claim 6, wherein the corrosion inhibitor comprises a cation selected from the group consisting of ions having the following formula (1):

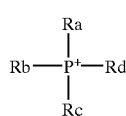

(1)

wherein Ra, Rb, Rc and Rd independently represent a linear, branched or ring alkyl group having 1 to 4 carbon atoms, a hydroxyalkyl group, a halogenated alkyl group, or a substituted or unsubstituted phenyl group;

ions having the following formula (3):

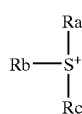

(3)

wherein Ra, Rb and Rc independently represent a linear, branched or ring alkyl group having 1 to 4 carbon atoms, a hydroxyalkyl group, a halogenated alkyl group, or a substituted or unsubstituted phenyl group;

ions having the following formula (4):

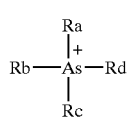

(4)

wherein Ra, Rb, Rc and Rd independently represent a linear, branched or ring alkyl group having 1 to 4 carbon atoms, a hydroxyalkyl group, a halogenated alkyl group, or a substituted or unsubstituted phenyl group;

a beryllium ion $Be^{2+}$; an aluminum ion $Al^{3+}$; a zinc ion $Zn^{2+}$; a titanium ion $Ti^{4+}$; a zirconium ion $Zr^{4+}$; and a silicide ion $Si^{2+}$.

9. The ink composition according to claim 1, wherein the corrosion inhibitor comprises a compound comprising a boron atom.

10. The ink composition according to claim 1, wherein the corrosion inhibitor comprises an acetylene compound having the following formula (2):

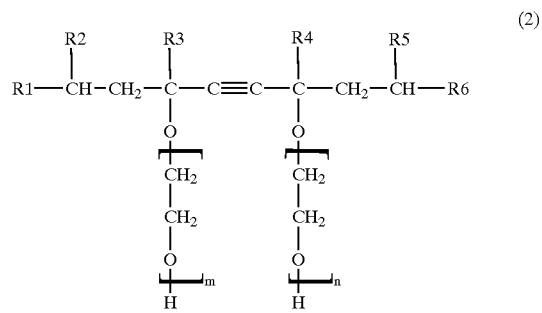

(2)

wherein R1 to R6 independently represent a linear alkyl group having from 1 to 5 carbon atoms; and m and n independently are 0 or an integer of from 1 to 20.

11. The ink composition according to claim 6, wherein the corrosion inhibitor is included in the ink composition in an amount of from 0.05% to 5.0% based on total weight of the ink composition.

12. The ink composition according to claim 11, wherein the corrosion inhibitor is included in the ink composition in an amount of from 0.1% to 2.0% based on total weight of the ink composition.

13. The ink composition according to claim 12, wherein the corrosion inhibitor is included in the ink composition in an amount of from 0.2% to 0.8% based on total weight of the ink composition.

14. The ink composition according to claim 1, wherein the colorant is a microencapsulated colorant.

15. The ink composition according to claim 14, wherein the microencapsulated colorant has a shell including a hydrophilic resin.

16. The ink composition according to claim 14, wherein the microencapsulated colorant is a microencapsulated pigment.

17. The ink composition according to claim 14, wherein the microencapsulated colorant has an average particle diameter of from 0.01 to 0.2 $\mu$m and wherein the microencapsulated colorant is included in the ink in an amount of 0.1 to 10% by weight based on total weight of the ink.

18. An ink composition comprising:

a colorant; and a solvent, wherein the ink composition has a zeta potential 1 not greater than −20 mV at a pH of from 6.5 to 11.5.

19. A method for adjusting a zeta potential 1 of an ink composition, comprising:

adding a corrosion inhibitor to the ink composition to adjust the zeta potential 1 so as to be not greater than −20 mV at a pH of from 6.5 to 11.5.

20. A method for adjusting a zeta potential 2 of an ink composition, comprising:

adding a corrosion inhibitor to the ink composition to adjust the zeta potential 2 so as to be not from 0 to −50 mV at a pH of from 6.5 to 11.5.

* * * * *